United States Patent
Seregin et al.

(10) Patent No.: US 11,659,201 B2
(45) Date of Patent: May 23, 2023

(54) SYSTEMS AND METHODS FOR GENERATING SCALING RATIOS AND FULL RESOLUTION PICTURES

(71) Applicant: QUALCOMM Incorporated, San Diego, CA (US)

(72) Inventors: Vadim Seregin, San Diego, CA (US); Adarsh Krishnan Ramasubramonian, Irvine, CA (US); Muhammed Zeyd Coban, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 185 days.

(21) Appl. No.: 16/990,910

(22) Filed: Aug. 11, 2020

(65) Prior Publication Data
US 2021/0051341 A1    Feb. 18, 2021

Related U.S. Application Data

(60) Provisional application No. 62/888,357, filed on Aug. 16, 2019.

(51) Int. Cl.
*H04N 19/59*    (2014.01)
*H04N 19/184*   (2014.01)
*H04N 19/172*   (2014.01)

(52) U.S. Cl.
CPC ........... *H04N 19/59* (2014.11); *H04N 19/172* (2014.11); *H04N 19/184* (2014.11)

(58) Field of Classification Search
CPC ............... H04N 19/117; H04N 19/167; H04N 21/23439; H04N 21/234372;
(Continued)

(56) References Cited

U.S. PATENT DOCUMENTS

2012/0063515 A1*  3/2012  Panchal ............... H04N 19/51
                                                375/E7.123
2012/0207214 A1*  8/2012  Zhou ................... H04N 19/137
                                                375/E7.243
(Continued)

FOREIGN PATENT DOCUMENTS

EP       3668102 A1     6/2020
WO    2019031469 A1    2/2019

OTHER PUBLICATIONS

Chen et al. "Resampling Process of the Scalable High Efficiency Video Coding" IEEE 2015 Data Compression Conference, pp. 23-29. (Year: 2015).*
(Continued)

*Primary Examiner* — Nathnael Aynalem
(74) *Attorney, Agent, or Firm* — Polsinelli LLP

(57) ABSTRACT

Systems, methods, and computer-readable storage media for calculating scaling ratios are described. An example method can include obtaining a current picture of video data and one or more scaling windows associated with the current picture and/or a reference picture selected for use in coding the current picture; determining a first size of the current picture and/or a second size of the reference picture, the first size including a first height and a first width and the second size including a second height and a second width; based on the one or more scaling windows and the first size and/or the second size, determining one or more scaling ratios associated with the current picture and/or the reference picture.

40 Claims, 10 Drawing Sheets

(58) Field of Classification Search
CPC ........... H04N 21/234363; H04N 19/70; H04N 19/59; H04N 19/587; H04N 19/172; H04N 19/187
USPC ........................................ 375/240.01–240.29
See application file for complete search history.

(56) References Cited

U.S. PATENT DOCUMENTS

| | | | |
|---|---|---|---|
| 2014/0241437 A1* | 8/2014 | Seregin ................. | H04N 19/33 375/240.24 |
| 2016/0255354 A1* | 9/2016 | Yamamoto ............. | H04N 19/44 375/240.12 |
| 2016/0269684 A1 | 9/2016 | Lim et al. | |

OTHER PUBLICATIONS

Chen (Broadcom) P., et al., "AHG19: Adaptive Resolution Change", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0279, Mar. 24, 2019 (Mar. 24, 2019), XP030204765, pp. 1-7, Retrieved from the Internet: URL: http://phenix.int-evry.fr/vet/doc_end_user/documents/14_Geneva/wg11/JVET-N0279-v2.zip JVET-N0279-v2.docx [retrieved on Mar. 24, 2019], cited in the application, abstract; figure 1, Section 4.

International Search Report and Written Opinion—PCT/US2020/046023—ISA/EPO—dated Nov. 4, 2020.

Samuelsson (Sharplabs) J., et al., "AHG8: On Adaptive Resolution Change (ARC) High-Level Syntax (H LS)", 15. JVET Meeting, Jul. 3, 2019-Jul. 12, 2019, Gothenburg, (The Joint Video Exploration Team of ISO/IEC JTC 1/ SC29 /WG11 and ITU-TSG.16 ), No. JVET-O0204, Jul. 5, 2019 (Jul. 5, 2019), XP838218848, 6 pages, Retrieved from the Internet: URL: http://phenix.int-evry.fr/jvet/doc_end_user/documents/15_Gothenburg/wg11/JVET-O0204-v3.zip. JVET-O0204-v3.docx [retrieved on Jul. 5, 2019] the whole document.

Suehring K., et al., "AHG17: Conformance Window", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0352, Mar. 12, 2019 (Mar. 12, 2019), XP030202762, 2 pages, Retrieved from the Internet: URL: http://phenix.int-evry.fr/jvet/doc_end_user/documents/14_Geneva/wg11/JVET-N0352-v1.zip. JVET-N0352.docx [retrieved on Mar. 12, 2019] the whole document.

* cited by examiner

SYSTEMS AND METHODS FOR GENERATING SCALING RATIOS AND FULL RESOLUTION PICTURES

CROSS-REFERENCE TO RELATED APPLICATIONS

This application claims the benefit of U.S. Provisional Application No. 62/888,357, filed Aug. 16, 2019, which is hereby incorporated by reference in its entirety and for all purposes.

TECHNICAL FIELD

This application is related to video coding and compression. More specifically, this application relates to systems and methods of calculating scaling ratios.

BACKGROUND

Many devices and systems allow video data to be processed and output for consumption. Digital video data generally includes large amounts of data to meet the demands of video consumers and providers. For example, consumers of video data typically prefer or desire videos of high quality, fidelity, resolution, frame rates, and the like. As a result, the large amount of video data that is required to meet these demands places a burden on communication networks and devices that process and store the video data.

Various video coding techniques may be used to compress video data. The video coding techniques can be performed according to one or more video coding standards. Example video coding standards that can be used for video coding include high-efficiency video coding (HEVC), advanced video coding (AVC), MPEG-2 Part 2 coding (MPEG stands for moving picture experts group), VP9, Alliance of Open Media (AOMedia) Video 1 (AV1), Essential Video Coding (EVC), Versatile Video Coding (VVC), or the like. To compress video data, video coding generally utilizes prediction methods (e.g., inter-prediction, intra-prediction, or the like) that take advantage of redundancy present in video images or sequences. One example goal of video coding is to compress video data into a form that uses a lower bit rate, while avoiding or minimizing degradations in video quality. With the increasing availability of ever-evolving video services, encoding techniques with improved coding accuracy and/or efficiency are needed.

BRIEF SUMMARY

Disclosed are systems, methods, and computer-readable media for calculating scaling ratios and decoupling the scaling ratio calculation from a picture output process. According to at least one example, a method is provided for calculating scaling ratios and decoupling the scaling ratio calculation from a picture output process. An example method can include obtaining a current picture of video data; determining one or more scaling windows associated with the current picture and/or a reference picture selected for use in coding the current picture; determining a first size of the current picture and/or a second size of the reference picture, the first size including a first height and a first width of the current picture and the second size including a second height and a second width of the reference picture; based on the one or more scaling windows and the first size and/or the second size, determining one or more scaling ratios associated with the current picture and/or the reference picture.

According to at least one example, a non-transitory computer-readable storage medium is provided for calculating scaling ratios and decoupling the scaling ratio calculation from a picture output process. An example non-transitory computer-readable storage medium can include instructions stored thereon which, when executed by one or more processors, cause the one or more processors to obtain a current picture of video data; determine one or more scaling windows associated with the current picture and/or a reference picture selected for use in coding the current picture; determine a first size of the current picture and/or a second size of the reference picture, the first size including a first height and a first width of the current picture and the second size including a second height and a second width of the reference picture; based on the one or more scaling windows and the first size and/or the second size, determine one or more scaling ratios associated with the current picture and/or the reference picture.

According to at least one example, an apparatus is provided for calculating scaling ratios and decoupling the scaling ratio calculation from a picture output process. An example apparatus can include memory and one or more processors coupled to the memory, the one or more processors being configured to obtain a current picture of video data; determine one or more scaling windows associated with the current picture and/or a reference picture selected for use in coding the current picture; determine a first size of the current picture and/or a second size of the reference picture, the first size including a first height and a first width of the current picture and the second size including a second height and a second width of the reference picture; based on the one or more scaling windows and the first size and/or the second size, determine one or more scaling ratios associated with the current picture and/or the reference picture.

According to at least one example, another apparatus is provided for calculating scaling ratios and decoupling the scaling ratio calculation from a picture output process. The apparatus can include means for obtaining a current picture of video data; determining one or more scaling windows associated with the current picture and/or a reference picture selected for use in coding the current picture; determining a first size of the current picture and/or a second size of the reference picture, the first size including a first height and a first width of the current picture and the second size including a second height and a second width of the reference picture; based on the one or more scaling windows and the first size and/or the second size, determining one or more scaling ratios associated with the current picture and/or the reference picture.

In some aspects, the method, non-transitory computer-readable medium, and apparatuses described above can include adjusting, based on the one or more scaling ratios, one or more motion compensation parameters associated with the current picture and/or the reference picture.

In some aspects, the method, non-transitory computer-readable medium, and apparatuses described above can include the one or more scaling windows in a picture parameter set (PPS); and store and/or transmit the PPS including the one or more scaling windows.

In some examples, the one or more scaling ratios are derived for horizontal and vertical directions. In some cases, the one or more scaling windows can include a scaling window of the current picture, and the scaling window of the current picture can be determined from PPS referred by the current picture.

In some examples, the one or more scaling windows can include a scaling window of the reference picture, and the scaling window of the reference picture can be determined from a PPS referred by the reference picture.

In some cases, the one or more scaling windows can include scaling window offsets, and the scaling window offsets can include a left scaling window offset, a right scaling window offset, a top scaling window offset, and/or a bottom scaling window offset. In some examples, at least one scaling window offset of the scaling window offsets can include a negative value. In some cases, determining the one or more scaling ratios can include adding the scaling window offsets to the first size of the current picture and/or the second size of the reference picture.

In some examples, the one or more scaling windows can include a first scaling window associated with the current picture and a second scaling window associated with the reference picture, and the one or more scaling ratios can be determined based on the first scaling window and the second scaling window.

In some aspects, the method, non-transitory computer-readable medium, and apparatuses described above can include obtaining one or more conformance windows associated with the current picture and the reference picture; and resizing the current picture and/or the reference picture based on the one or more conformance windows. In some cases, the one or more conformance windows are determined from a SPS.

In some aspects, the method, non-transitory computer-readable medium, and apparatuses described above can include the one or more conformance windows in a SPS; and store and/or transmit the SPS including the one or more conformance windows.

In some aspects, the method, non-transitory computer-readable medium, and apparatuses described above can include obtaining a maximum picture size indicating a maximum picture width and a maximum picture height; and generating an output picture based on the maximum picture size and a conformance window including one or more window offsets. In some examples, a size of the current picture equals the maximum picture size, and the output picture includes the current picture with the size equal to the maximum picture size cropped based on the conformance window. In some examples, the current picture is cropped by applying the one or more window offsets to the current picture. In some cases, the maximum picture size and the conformance window are determined from a SPS.

In some aspects, the method, non-transitory computer-readable medium, and apparatuses described above can include the maximum picture size and the conformance window in a SPS; and store and/or transmit the SPS including the maximum picture size and the conformance window.

In some examples, the one or more scaling windows are further associated with one or more additional reference pictures selected for use in coding the current picture, and the one or more scaling ratios are further associated with the one or more additional reference pictures.

In some aspects, the method, non-transitory computer-readable medium, and apparatuses described above can include generating an encoded video bitstream including the one or more scaling windows and a set of conformance windows, the set of conformance windows including one or more first window offsets for resizing the current picture and one or more second window offsets for resizing the reference picture; and storing and/or transmitting the encoded video bitstream.

In some aspects, any of the apparatuses described above can include a mobile device with a camera for capturing one or more pictures. In some aspects, any of the apparatuses described above can include a display for displaying one or more pictures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
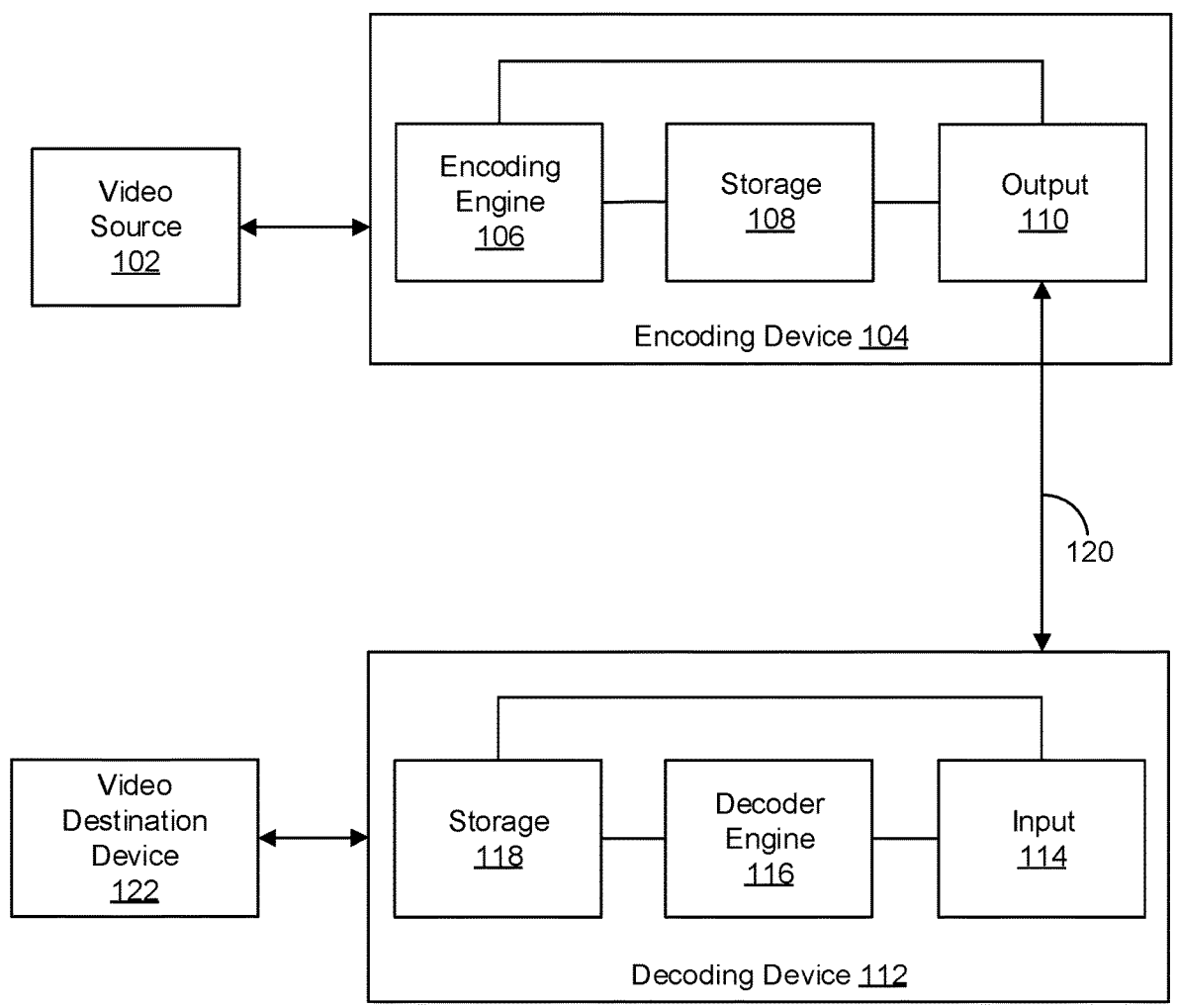
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Certain coding schemes can implement reference picture resampling (RPR), which allows a current picture and a reference picture(s) to have different resolutions. With RPR, in motion compensation the difference in picture resolutions can be considered during interpolation filtering by adjusting the interpolation filter phase and reference block start position. The scaling ratio can be derived for horizontal and vertical directions based on the current picture and reference picture widths and heights, and the current picture and reference picture conformance windows.

In some examples, the variables PicOutputWidthL and PicOutputHeightL, corresponding to a picture width and a picture height, can be derived for luma samples as follows:

$$\text{PicOutputWidth}L = \text{pic\_width\_in\_luma\_samples} - \text{SubWidth}C * (\text{conf\_win\_right\_offset} + \text{conf\_win\_left\_offset}) \quad \text{Equation (1)}$$

$$\text{PicOutputHeight}L = \text{pic\_height\_in\_luma\_samples} - \text{SubHeight}C * (\text{conf\_win\_bottom\_offset} + \text{conf\_win\_top\_offset}) \quad \text{Equation (2)}$$

The PicOutputWidthL and PicOutputHeightL can be calculated for a current picture and a reference picture. Moreover, pic_width_in_luma_samples and pic_height_in_luma_samples can refer to the width and height of a picture (e.g., a current picture, a reference picture, a decoded picture, an output picture, etc.) in units of luma samples, SubWidthC and SubHeightC can correspond to the chroma sampling relative to luma sampling (e.g., both equal to 1 when there is a corresponding chroma sample for each luma sample (e.g., as in a 4:4:4: format for example), both equal 2 when there is only one chroma sample for 4 luma samples (e.g., as in a 4:2:0 format for example), etc.), and conf_win_right_offset, conf_win_left_offset, conf_win_bottom_offset, conf_win_top_offset can refer to the left, right, bottom and top offsets in a conformance window, which can define a window size of a decoded picture output.

The scaling ratio, which in some examples can be used to scale the motion vector and/or ensure the motion vector uses the correct coordinates of a picture, can be derived as follows:

$$\text{hori\_scale\_}fp = ((f\text{RefWidth} << 14) + (\text{PicOutputWidth}L >> 1)) / \text{PicOutputWidth}L \quad \text{Equation (3)}$$

$$\text{vert\_scale\_}fp = ((f\text{RefHeight} << 14) + (\text{PicOutputHeight}L >> 1)) / \text{PicOutputHeight}L \quad \text{Equation (4)}$$

PicOutputWidthL and PicOutputHeightL can be the picture width and height variables derived for a picture. In some examples, in Equations (3) and (4), PicOutputWidthL and PicOutputHeightL can correspond to the width and height of the current picture. Moreover, the variable fRefWidth can be set equal to the PicOutputWidthL of the reference picture in luma samples, and the variable fRefHeight can be set equal to PicOutputHeightL of the reference picture in luma samples.

The starting position (top left corner) of a block in a reference picture, denoted as (xIntL, yIntL), and a filter phase or an offset given in ⅟₁₆-sample units, denoted as (xFracL, yFracL), can be derived as follows. Given (refxSb$_L$, refySb$_L$) and (refx$_L$, refy$_L$) representing luma locations pointed to by a motion vector (refMvLX[0], refMvLX[1]) given in ⅟₁₆-sample units, the variables refxSb$_L$, refx$_L$, refySb$_L$, and refy$_L$ can be derived as follows:

$$\text{refxSb}_L = ((x\text{Sb} << 4) + \text{refMvLX}[0]) * \text{hori\_scale\_fp} \quad \text{Equation (5)}$$

$$\text{refx}_L = ((\text{Sign}(\text{refxSb}) * ((\text{Abs}(\text{refxSb}) + 128) >> 8) + x_L * ((\text{hori\_scale\_fp} + 8) >> 4)) + 32) >> 6 \quad \text{Equation (6)}$$

$$\text{refySb}_L = ((y\text{Sb} << 4) + \text{refMvLX}[1]) * \text{vert\_scale\_fp} \quad \text{Equation (7)}$$

$$\text{refy}L = ((\text{Sign}(\text{refySb}) * ((\text{Abs}(\text{refySb}) + 128) >> 8) + yL * ((\text{vert\_scale\_fp} + 8) >> 4)) + 32) >> 6 \quad \text{Equation (8)}$$

The variables xInt$_L$, yInt$_L$, xFrac$_L$ and yFrac$_L$ can also be derived as follows:

$$x\,\text{Int}_L = \text{refx}_L >> 4 \quad \text{Equation (9)}$$

$$y\,\text{Int}_L = \text{refy}_L >> 4 \quad \text{Equation (10)}$$

$$x\text{Frac}_L = \text{refx}_L\ \&\ 15 \quad \text{Equation (11)}$$

$$y\text{Frac}_L = \text{refy}_L\ \&\ 15 \quad \text{Equation (12)}$$

where (xSb, ySb) can specify the top-left sample of the current coding subblock relative to the top-left luma sample of the current picture, and refMvLX can be a motion vector for a reference picture list LX (X is 0 and 1).

Equations (1) through (12) are described above with respect to luma samples. However, Equations (1) through (12) described above can be implemented and/or repeated for chroma color components. Thus, the process described above for calculating and using picture width and height, the scaling ratio, and location, sample and motion vector information can be repeated for chroma components.

Various problems and challenges can arise when calculating the scaling ratio from the picture size and conformance window offsets as illustrated above. For example, a conformance window may define the picture output (e.g., for a displayed picture). In other words, the output picture may be cropped by applying the conformance window. When using the conformance window to calculate the scaling ratio (e.g., the scaling ratio can be derived between the cropped input picture and the cropped output picture, but the derived scaling ratio is applied to scale the decoded (e.g., before cropping) input picture to ensure the size of the picture matches the decoded output picture size), the scaling ratio calculated for the cropped pictures and decoded pictures may not be the same. As a result, the rescaling process may result in inaccuracies and/or the wrong rescaled picture.

In another illustrative example, the conformance window offsets may be different for different picture sizes, since the decoded picture size is a multiple of N number of samples (e.g., N=8 in VVC). In some cases, the conformance window offsets may be larger for smaller decoded picture sizes and smaller for larger picture sizes.

In another illustrative example, since the scaling ratios can be derived based on the cropped picture sizes but applied to the decoded picture size, the rescaled picture size may be different than the size of the needed and/or intended rescaled picture due to possible differences in the scaling ratios derived for cropped and decoded pictures. In VVC, the output picture is the decoded picture after cropping. Accordingly, in VVC, a resolution change may result in the output pictures having different sizes, which can create problems and may be undesirable in some applications. For example, in some applications such as video conferencing applications, users may not want to see the size of pictures vary over the time. Thus, in this example, the different output picture sizes would be undesirable to users.

The technologies described herein can address the foregoing problems associated with scaling ratio derivation. In some aspects, one or more systems and methods of processing video data are directed to determining scaling ratios and decoupling the scaling ratio determination from the picture output process. In some examples, the techniques described herein for determining scaling ratios can prevent mismatches between the scaling ratio calculated for cropped and decoded pictures (and associated rescaling problems), different conformance window offsets for different picture sizes, differences between the size of a rescaled picture generated using a scaling ratio and the size needed and/or intended for the rescaled picture, and differences in output picture sizes when picture resolution changes occur. In some cases, the techniques described herein for determining scaling ratios can prevent motion compensation problems such as discrepancies between motion vectors and corresponding picture coordinates.

Figure 7:
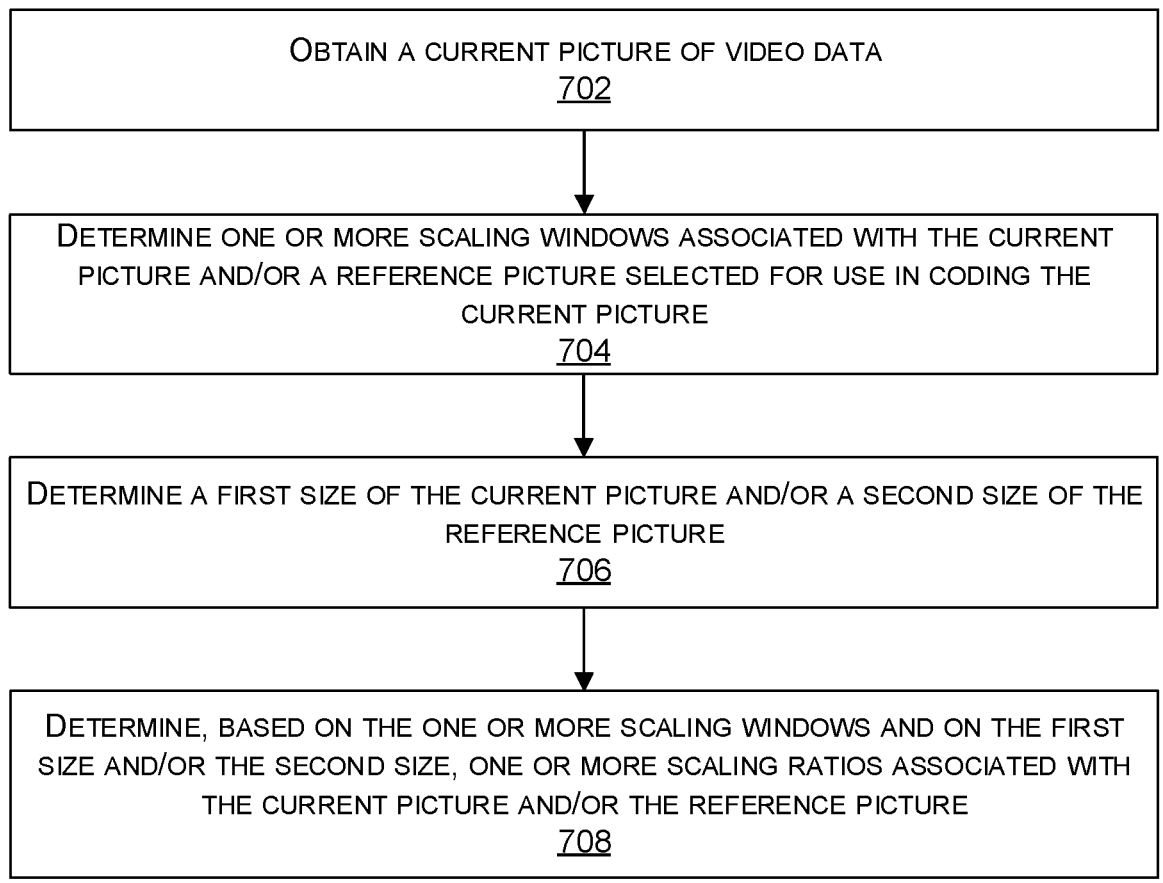
FIG. 7 is a flowchart illustrating an example process for calculating a scaling ratio and decoupling the scaling ratio calculation from a picture output process, in accordance with some examples.
Figure 8:
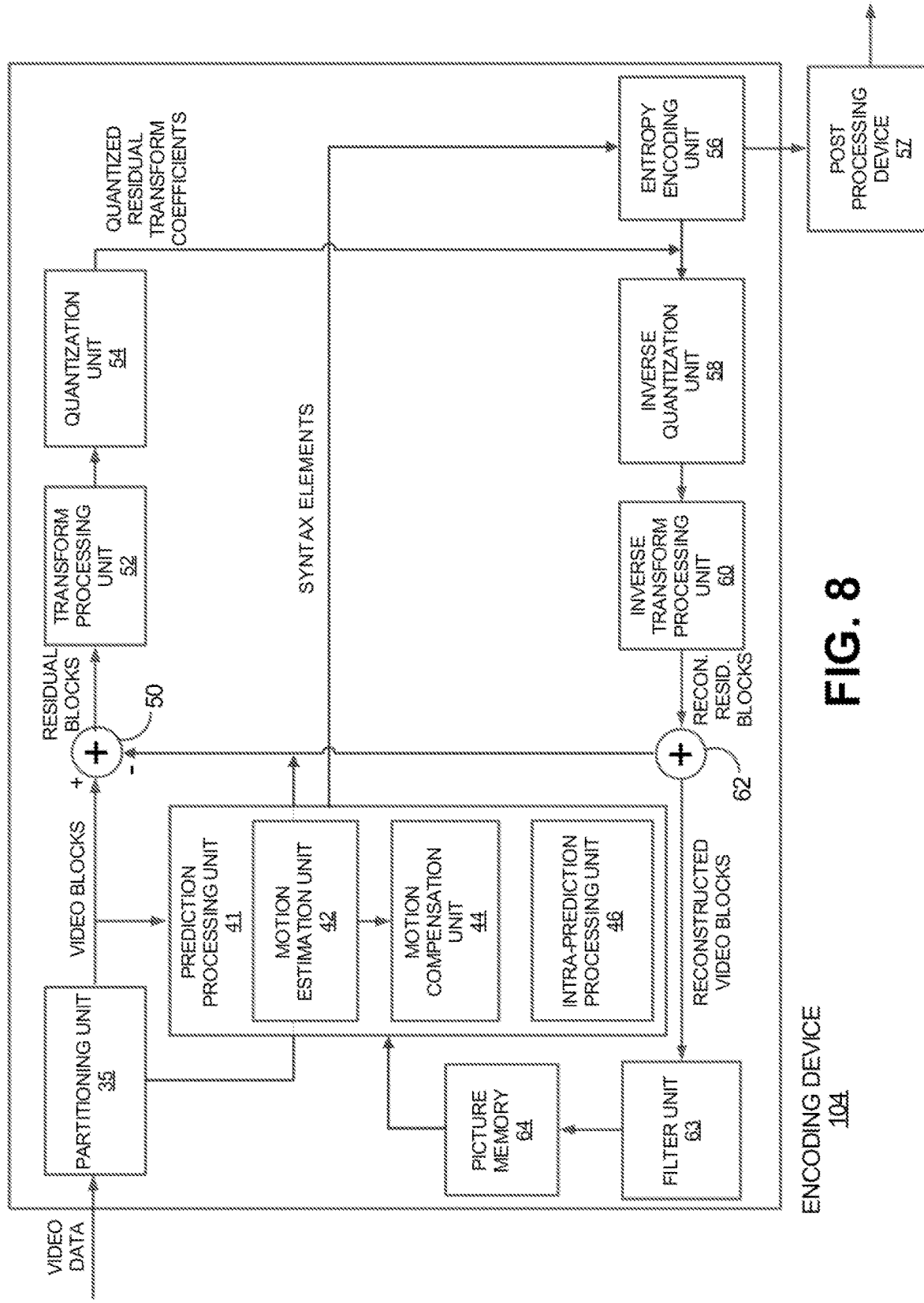
FIG. 8 is a block diagram illustrating an example video encoding device, in accordance with some examples.
Figure 9:
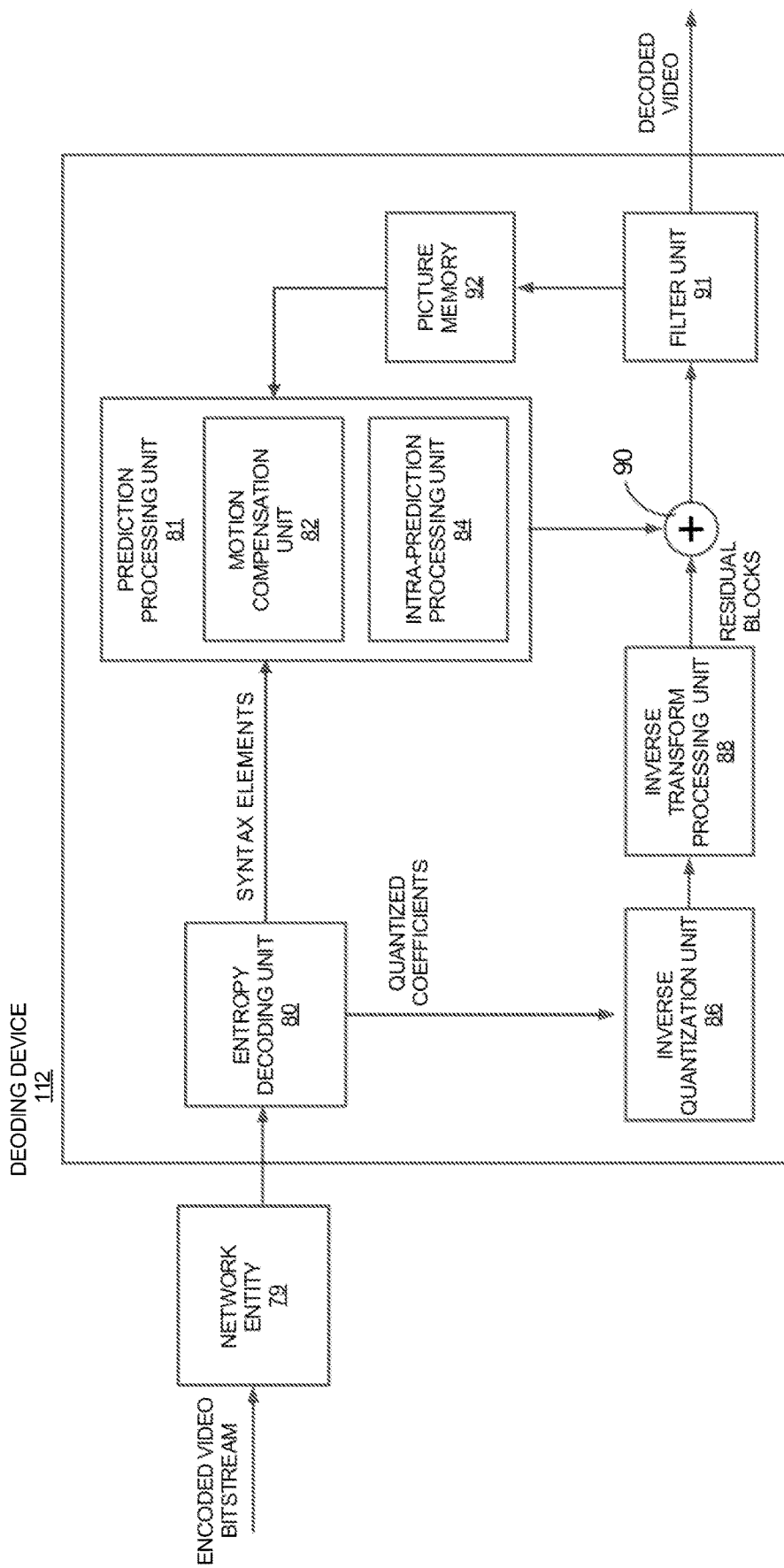
FIG. 9 is a block diagram illustrating an example video decoding device, in accordance with some examples.

The present technologies will be described in the following disclosure as follows. The discussion begins with a description of example systems and technologies for coding video data and calculating scaling ratios, as illustrated in FIGS. 1 through 6. A description of an example method for calculating a scaling ratio and decoupling the scaling ratio calculation from a picture output process, as illustrated in FIG. 7, will then follow. The discussion concludes with a description of example encoding and decoding devices suitable for coding video data and determining scaling ratios, as illustrated in FIGS. 8 and 9. The disclosure now turns to FIG. 1.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC, including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 11. An example of specific details of the decoding device 112 is described below with reference to FIG. 12.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, one or more scaling window offsets can be included along with stored motion vectors in a MV candidate list.

In examples where a MV candidate list is used for motion prediction of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g. information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2A:
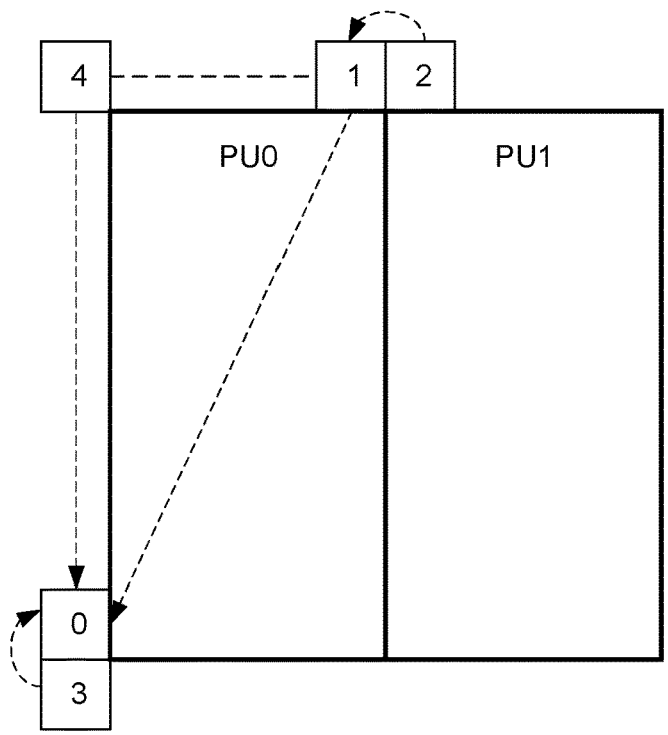
FIG. 2A is a conceptual diagram illustrating example spatial neighboring motion vector candidates for a merge mode, in accordance with some examples.
Figure 2B:
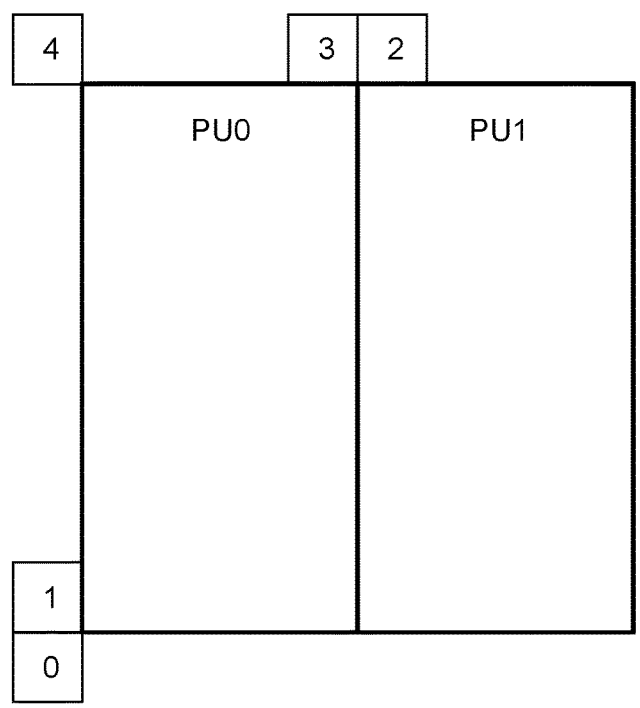
FIG. 2B is a conceptual diagram illustrating example spatial neighboring motion vector candidates for an advanced motion vector prediction (AMVP) mode, in accordance with some examples.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder and/or decoder can form a merging candidate list by considering merging candidates from various motion data positions. For example, as shown in FIG. 2A, up to four spatial MV candidates can be derived with respect spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
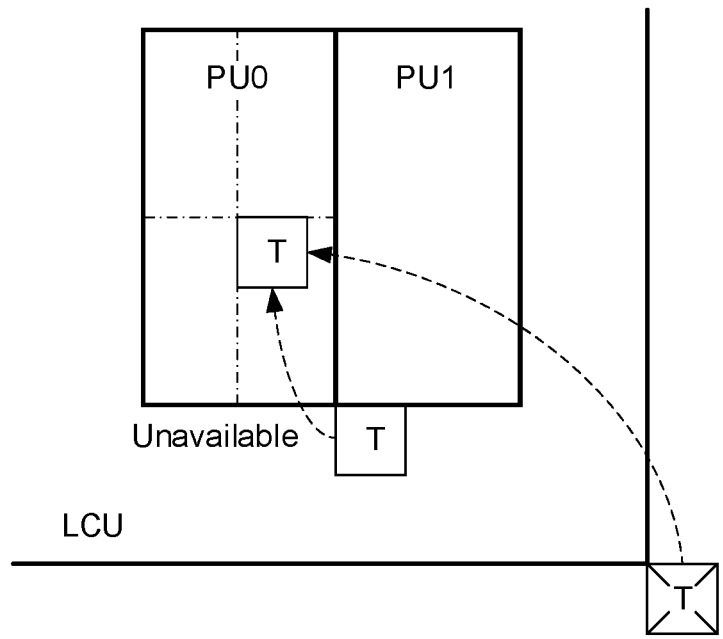
FIG. 3A is a conceptual diagram illustrating an example temporal motion vector predictor (TMVP) candidate, in accordance with some examples.
Figure 3B:
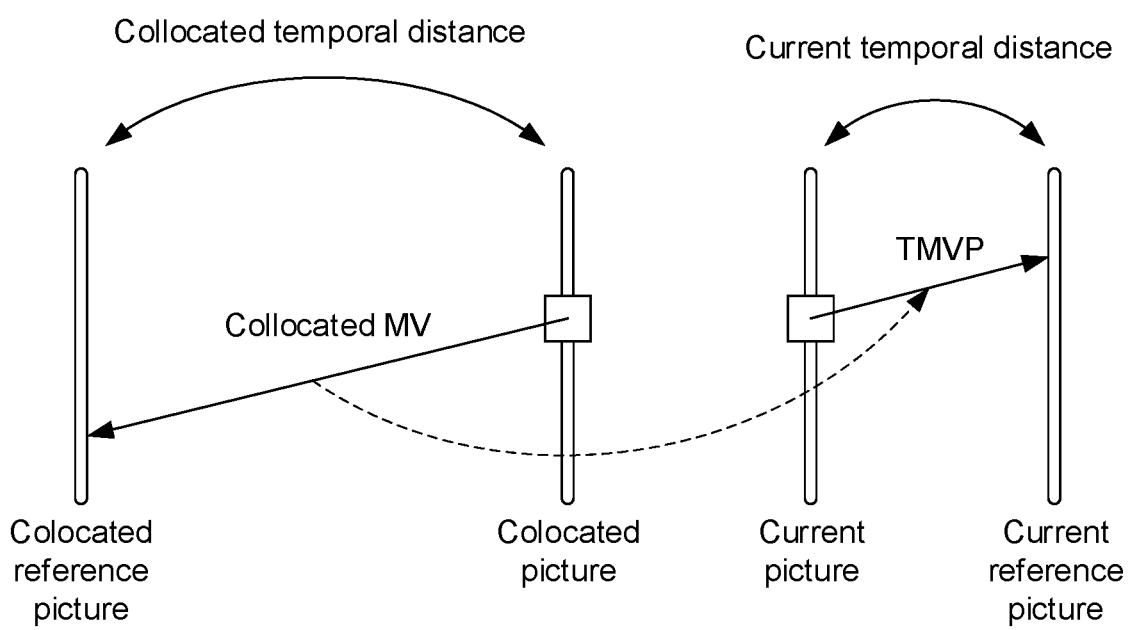
FIG. 3B is a conceptual diagram illustrating an example of motion vector scaling, in accordance with some examples.

FIG. 3A and FIG. 3B include conceptual diagrams illustrating temporal motion vector prediction. A temporal motion vector predictor (TMVP) candidate, if enabled and available, is added to a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement ($\Delta y$) (indicating a position of a reference block relative to a position of the current block) of a stored motion vector can be compared to the horizontal displacement ($\Delta x$) and the vertical displacement ($\Delta y$) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on this comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

In certain coding schemes such as HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is p(x, y), then $p'(x, y)=((a*p(x, y)+(1<<(s-1)))>>s)+b$ instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figure 4A:
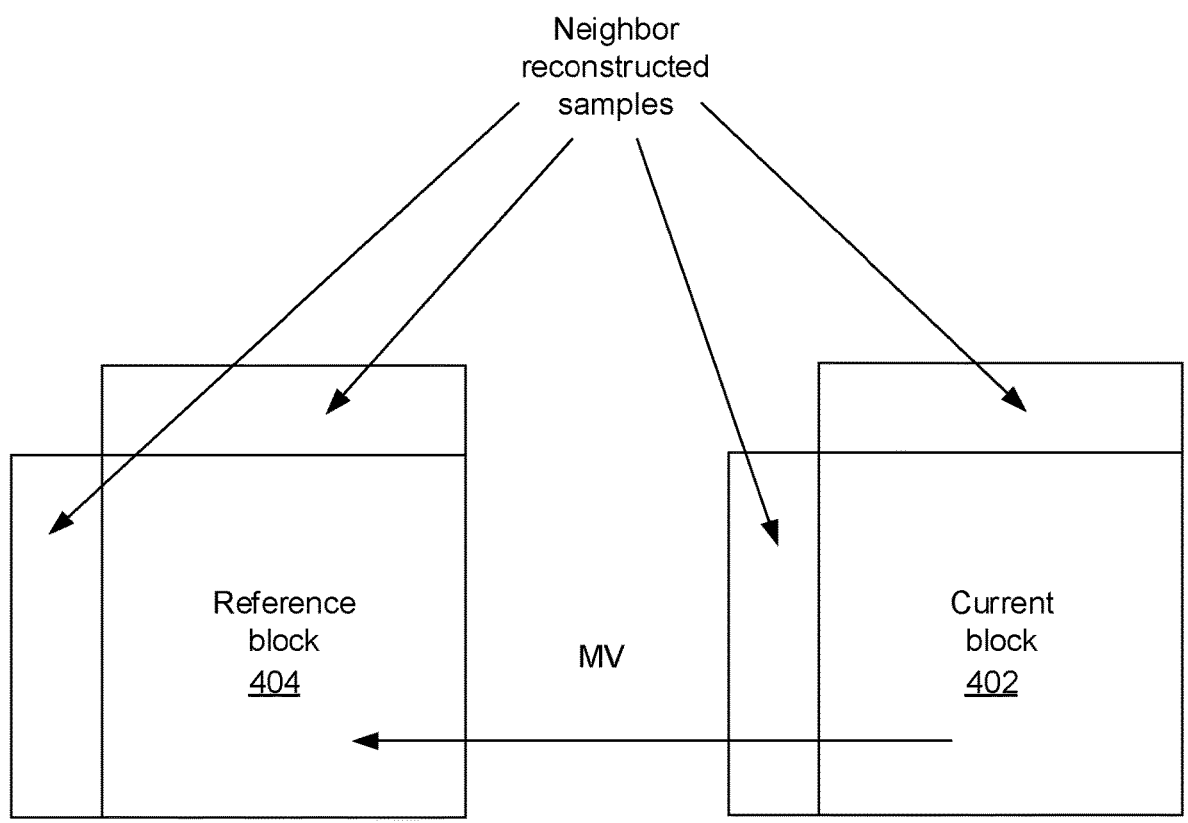
FIG. 4A is a conceptual diagram illustrating an example of neighboring samples of a current coding unit used for estimating motion compensation parameters for the current coding unit, in accordance with some examples.
Figure 4B:
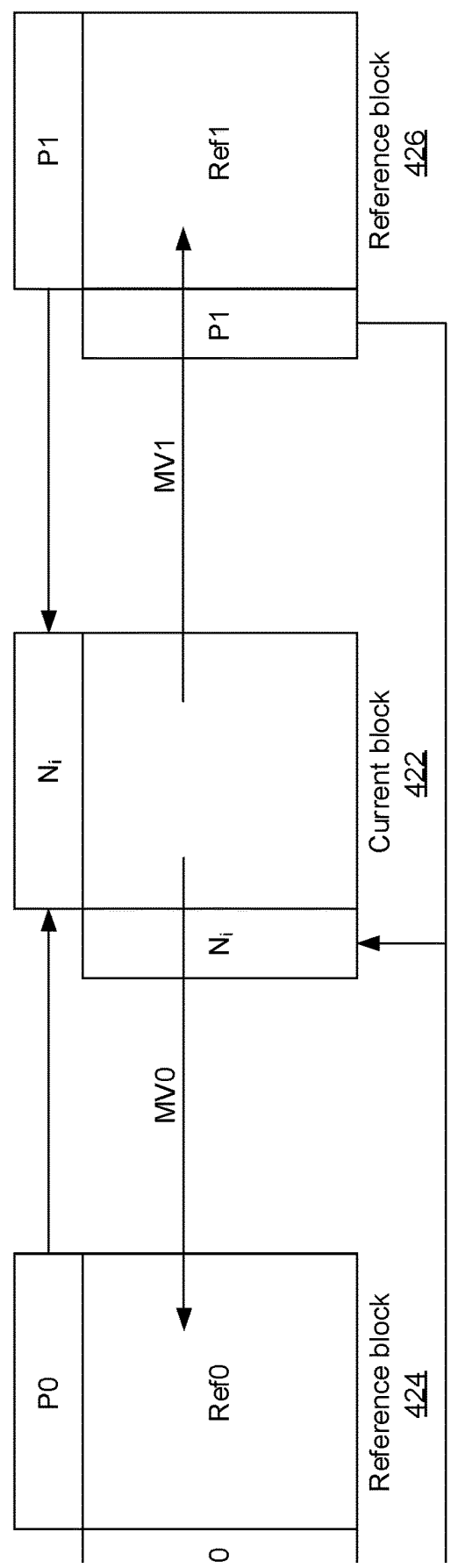
FIG. 4B is a conceptual diagram illustrating an example of neighboring samples of a reference block used for estimating motion compensation parameters for a current coding unit, in accordance with some examples.

FIG. 4A is a diagram illustrating an example of neighbor reconstructed samples of a current block 402 and neighbor samples of a reference block 404 used for uni-directional inter-prediction. A motion vector MV can be coded for the current block 402, where the MV can include a reference index to a reference picture list and/or other motion information for identifying the reference block 404. For example, the MV can include a horizontal and a vertical component that provides an offset from the coordinate position in the current picture to the coordinates in the reference picture identified by the reference index. FIG. 4B is a diagram illustrating an example of neighbor reconstructed samples of a current block 422 and neighbor samples of a first reference block 424 and a second reference block 426 used for bi-directional inter-prediction. In this case, two motion vectors MV0 and MV1 can be coded for the current block 422 to identify the first reference block 424 and a second reference block 426, respectively.

In some cases, changes made to a reference picture and/or a current picture can result in different picture sizes and/or resolutions. For example, certain tasks, such as reference picture resampling (RPR), can result in current pictures and reference pictures with different resolutions. However, discrepancies between current picture and reference picture sizes and/or resolutions can lead to various problems as previously explained. For example, differences between current picture and reference picture sizes and/or resolutions can lead to motion compensation problems such as discrepancies between motion vectors and corresponding picture coordinates. To address these and other issues, the techniques described herein for determining scaling ratios can decouple the scaling ratio calculation from the picture output process, and can prevent motion compensation problems such as discrepancies between motion vectors and corresponding picture coordinates.

Figure 5:
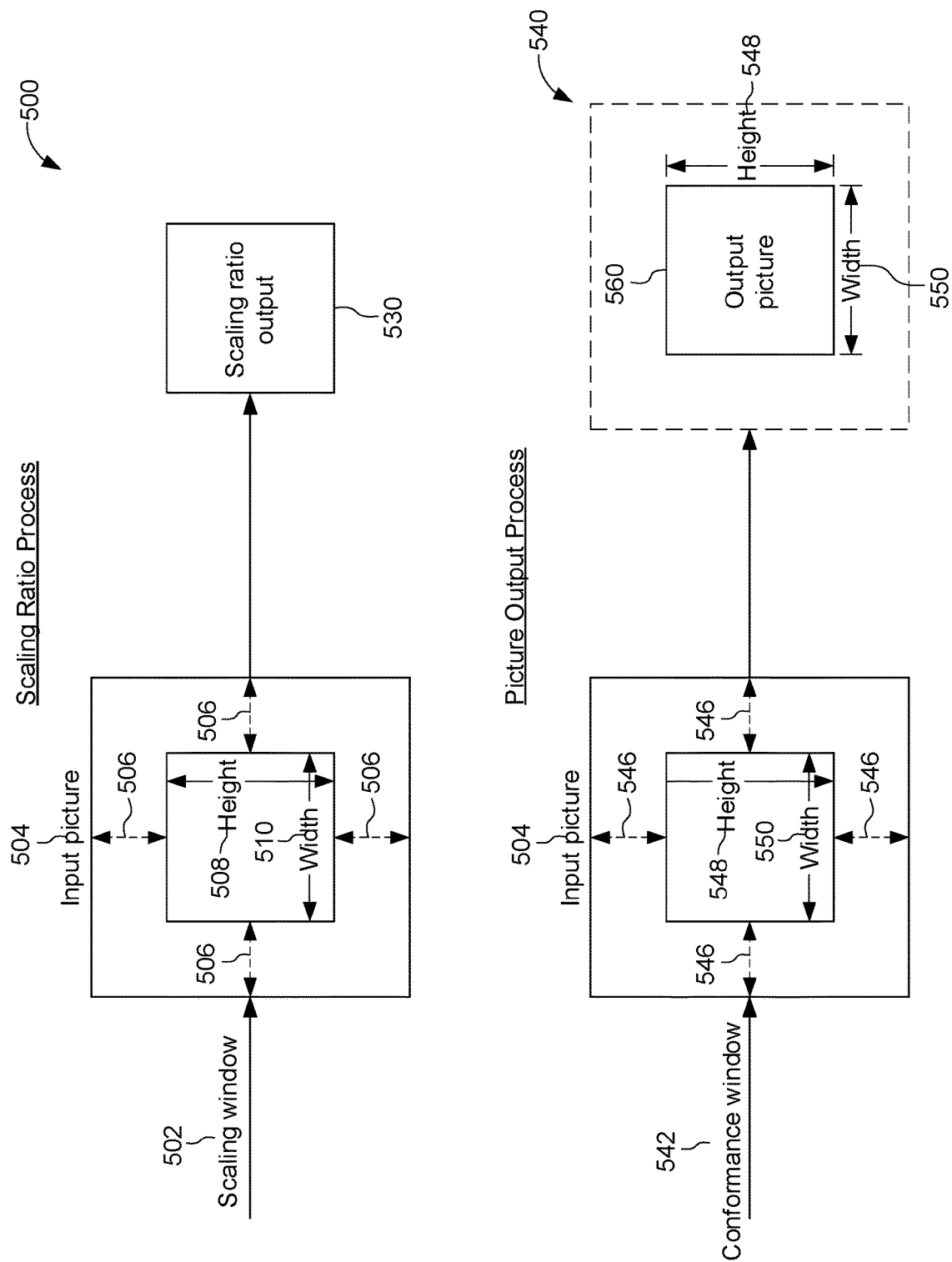
FIG. 5 is a conceptual diagram illustrating an example scaling ratio calculation decoupled from a picture output process, in accordance with some examples.

FIG. 5 is a diagram illustrating an example scaling ratio calculation decoupled from the picture output process. In some cases, the example scaling ratio calculation in FIG. 5 can prevent motion compensation problems, mismatches between the scaling ratio calculated for cropped and decoded pictures (and associated rescaling problems), different conformance window offsets for different picture sizes, differences between the size of a rescaled picture generated using a scaling ratio and the size needed and/or intended for the rescaled picture, differences in output picture sizes when picture resolution changes occur, among other issues related to scaling or coding video data.

Moreover, by decoupling the scaling ratio calculation from the picture output process, the conformance window (e.g., 542) used for the picture output process can be decoupled from the scaling window (e.g., 502) used for the scaling ration calculation. Decoupling the conformance window from the scaling ratio calculation can allow the conformance window to be modified by rewriting PPS in a bitstream to display a picture in a different size without further modifying the bitstream (e.g., on a block level), which may not be possible if the scaling ratio depends on the conformance window (e.g., is calculated based on the conformance window) since changing the conformance window may lead to a scaling ratio change that may affect the prediction derivation in a block.

In FIG. 5, the scaling ratio calculation 500 is decoupled from the picture output process 540. The scaling ratio calculation 500 can be performed for an input picture 504 (e.g., a current picture, a reference picture, etc.) based on a scaling window 502. In some examples, the scaling window 502 can be signaled by the encoding device (e.g., 104). The scaling window 502 can identify window offsets 506 for calculating a scaling ratio for the input picture 504. For example, the scaling window 502 can define a top offset, a bottom offset, a left offset, and/or a right offset which can be added to the height 508 and width 510 of the input picture 504 to generate a scaling ratio output 530 indicating a scaling ratio calculated for the input picture 504. Thus, the input picture 504 and the window offsets 506 from the scaling window 502 can be used to calculate a scaling ratio (e.g., scaling ratio output 530) for the input picture 504.

In some cases, the scaling ratio output 530 can include a vertical (e.g., height) and horizontal (e.g., width) scaling ratio. For example, the scaling ratio output 530 can indicate the vertical scaling ratio for input pictures (e.g., 504) and the horizontal scaling ratio for the input pictures. Moreover, in some examples, a scaling window (e.g., 502) can be signaled for each picture (e.g., for each current picture and each reference picture). The window offsets (e.g., 506) from the scaling window(s) can be used to derive a scaling ratio (e.g., 530) as previously explained.

In the picture output process 540, a conformance window 542 can be used to modify a size of the input picture 504. In some examples, the conformance window 542 can be signaled by the encoding device (e.g., 104). The conformance window 542 can identify window offsets 546 for resizing (e.g., scaling, cropping, etc.) the input picture 504. For example, the conformance window 542 can define a top offset, a bottom offset, a left offset, and/or a right offset to apply and/or implement for modifying the size of the input picture 504 from the top, bottom, left, and/or right based on the top offset, the bottom offset, the left offset, and/or the right offset, respectively. The window offsets 546 can be the same as or different than the window offsets 506 in the scaling window 502. In some examples, the window offsets 546 are the same as the window offsets 506 in the scaling window 502.

The window offsets 546 from the conformance window 542 can be used to resize (e.g., scale, crop, etc.) the input picture 504 to a particular height 548 and width 550. Thus, the input picture 504 and the window offsets 546 from the conformance window 542 can be used to generate an output picture 560 with the particular height 548 and width 550. The particular height 548 and width 550 can be the same as or different than the particular height 508 and width 510. In some examples, the particular height 548 and width 550 is the same as the particular height 508 and width 510 used with the scaling window 502 in the scaling ratio calculation 500.

Figure 6:
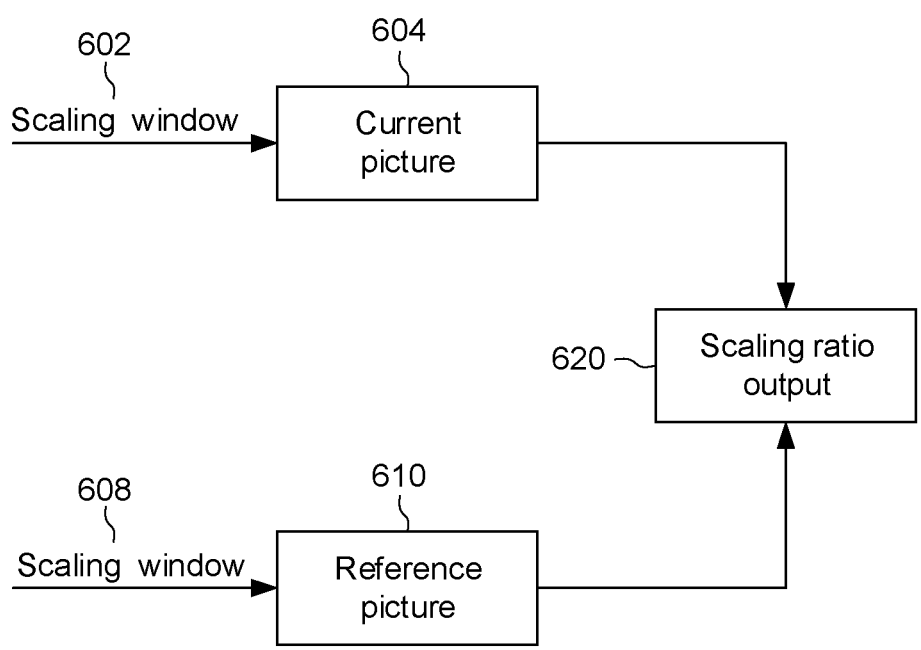
FIG. 6 is a conceptual diagram illustrating an example scaling ratio calculation based on a current picture and a reference picture, in accordance with some examples.

FIG. 6 is a diagram illustrating an example scaling ratio calculation based on a current picture 604 and a reference picture 610. In this example, scaling window 602 can be used to calculate a scaling ratio for the current picture 604, and scaling window 608 can be used to calculate a scaling ratio for the reference picture 610. The scaling windows 602 and 608 can identify a top offset, a bottom offset, a left offset, and/or a right offset for calculating the scaling ratio for the current picture 604 and reference picture 610, respectively. For example, the scaling window 602 can include a top offset, a bottom offset, a left offset, and a right offset which can be added to the height and width of the current picture 604 (e.g., from the top, bottom, left, and right of the current picture 604) to determine a scaling ratio for the current picture 604. Similarly, the scaling window 608 can include a top offset, a bottom offset, a left offset, and a right offset which can be added to the height and width of the reference picture 610 (e.g., from the top, bottom, left, and right of the reference picture 610) to determine a scaling ratio for the reference picture 610.

Accordingly, the scaling windows 602, 609 can be used to calculate a scaling ratio output 620 for the current picture 604 and the reference picture 610. The scaling ratio output 620 can include one or more scaling ratios. In some examples, the scaling ratio output 620 can include a vertical (e.g., height) and horizontal (e.g., width) scaling ratio for the current picture 604 and/or the reference picture 610. In some cases, the scaling ratio output 620 can indicate the vertical scaling ratio for the current picture 604 and the reference picture 610, and the horizontal scaling ratio for the current picture 604 and the reference picture 610.

In some cases, scaling ratios (e.g., 530, 620) can be calculated using Equations (13) through (16) and/or Equations (25) through (28) below. For example, in some illustrative implementations, the variables PicOutputWidthL and PicOutputHeightL (e.g., the width and height of the modified current or reference picture) for luma can be derived as follows:

PicOutputWidth$L$=pic_width_in_luma_samples−SubWidth$C$*(scaling_win_right_offset+scaling_win_left_offset)  Equation (13)

PicOutputHeight$L$=pic_height_in_luma_samples−SubHeight$C$*(scaling_win_bottom_offset+scaling_win_top_offset)  Equation (14)

The PicOutputWidthL and PicOutputHeightL can be calculated for the current picture (e.g., 604) and a reference picture (e.g., 610). In some cases, PicOutputWidthL and PicOutputHeightL can be calculated for a current picture (e.g., 604) and can represent the width and height of a modified current picture (e.g., 606), and can also be calculated for a reference picture (e.g., 610), in which case they can represent the width and height of a modified reference picture (e.g., 612). Moreover, pic_width_in_luma_samples and pic_height_in_luma_samples can refer to the width and height of a picture (e.g., a current picture, a reference picture, a decoded picture, an output picture, etc.) in units of luma samples, SubWidthC and SubHeightC can correspond to the chroma sampling relative to luma sampling (e.g., both equal to 1 when there is a corresponding chroma sample for each luma sample (e.g., as in a 4:4:4: format for example), both equal 2 when there is only one chroma sample for 4 luma samples (e.g., as in a 4:2:0 format for example), etc.), and scaling_win_right_offset, scaling_win_left_offset, scaling_win_bottom_offset, scaling_win_top_offset can correspond to the left, right, bottom and top offsets (e.g., 506) in a scaling window (e.g., 502, 602, 608).

The scaling ratio (e.g., 530, 620) can then be derived as follows:

hori_scale_$fp$=(($f$RefWidth<<14)+(PicOutputWidth$L$>>1))/PicOutputWidth$L$  Equation (15)

vert_scale_$fp$=(($f$RefHeight<<14)+(PicOutputHeight$L$>>1))/PicOutputHeight$L$  Equation (16)

In Equations (15) and (16), PicOutputWidthL and PicOutputHeightL can be the picture width and height variables derived for a picture. For example, PicOutputWidthL and PicOutputHeightL can be the width and height variables of the modified current picture (e.g., 606). In some cases, the variable fRefWidth can be set equal to the PicOutputWidthL of the reference picture in luma samples, and the variable fRefHeight can be set equal to PicOutputHeightL of the reference picture in luma samples. In other cases, fRefWidth and fRefHeight can respectively be set equal to pic_width_in_luma_samples and pic_height_in_luma_samples of the reference picture. Thus, in some examples, hori_scale_fp can provide the horizontal scaling ratio between the reference picture and the current picture, and vert_scale_fp can provide the vertical scaling ratio between the reference picture and the current picture.

In some examples, the starting position (top left corner) of a block in a reference picture, denoted as (xIntL, yIntL), and a filter phase or an offset given in 1/16-sample units, denoted as (xFracL, yFracL), can be derived as follows. Given (refxSb$_L$, refySb$_L$) and (refx$_L$, refy$_L$) representing luma locations pointed to by a motion vector (refMvLX[0], refMvLX[1]) given in 1/16-sample units, the variables refxSb$_L$, refx$_L$, refySb$_L$, and refy$_L$ can be derived as follows:

$$\text{refxSb}_L = ((x\text{Sb} << 4) + \text{refMvLX}[0]) * \text{hori\_scale\_}fp \quad \text{Equation (17)}$$

$$\text{refx}_L = ((\text{Sign}(\text{refxSb}) * ((\text{Abs}(\text{refxSb}) + 128) >> 8) + x_L * ((\text{hori\_scale\_}fp + 8) >> 4)) + 32) >> 6 \quad \text{Equation (18)}$$

$$\text{refySb}_L = ((y\text{Sb} << 4) + \text{refMvLX}[1]) * \text{vert\_scale\_}fp \quad \text{Equation (19)}$$

$$\text{refy}L = ((\text{Sign}(\text{refySb}) * ((\text{Abs}(\text{refySb}) + 128) >> 8) + yL * ((\text{vert\_scale\_}fp + 8) >> 4)) + 32) >> 6 \quad \text{Equation (20)}$$

The variables xInt$_L$, yInt$_L$, xFrac$_L$ and yFrac$_L$ can also be derived as follows:

$$x\text{ Int}_L = \text{refx}_L >> 4 \quad \text{Equation (21)}$$

$$y\text{ Int}_L = \text{refy}_L >> 4 \quad \text{Equation (22)}$$

$$x\text{Frac}_L = \text{refx}_L \& 15 \quad \text{Equation (23)}$$

$$y\text{Frac}_L = \text{refy}_L \& 15 \quad \text{Equation (24)}$$

where (xSb, ySb) can specify the top-left sample of the current coding subblock relative to the top-left luma sample of the current picture, and refMvLX can be a motion vector for a reference picture list LX (X is 0 and 1).

Equations (13) through (24) are described above with respect to luma samples. However, Equations (13) through (24) described above can be implemented and/or repeated for chroma color components. Thus, the process described above (or any portion of it) for calculating and using picture width and height, the scaling ratio, and location, sample and other motion compensation information can be repeated for chroma components.

For example, in some cases, the Equations (13) through (16) can similarly be performed for chroma samples, as well as Equations (17) through (24), as described in the illustrative example below. In some examples, the variables PicOutputWidthC and PicOutputHeightC for chroma can be derived as follows:

$$\text{PicOutputWidth}C = \text{pic\_width\_in\_chroma\_samples} - \text{SubWidth}C * (\text{scaling\_win\_right\_offset} + \text{scaling\_win\_left\_offset}) \quad \text{Equation (25)}$$

$$\text{PicOutputHeight}C = \text{pic\_height\_in\_chroma\_samples} - \text{SubHeight}C * (\text{scaling\_win\_bottom\_offset} + \text{scaling\_win\_top\_offset}) \quad \text{Equation (26)}$$

The PicOutputWidthC and PicOutputHeightC can be calculated for the current picture (e.g., 604) and a reference picture (e.g., 610). In some cases, PicOutputWidthC and PicOutputHeightC can be calculated for a current picture (e.g., 604) and can represent the width and height of a modified current picture (e.g., 606), and can also be calculated for a reference picture (e.g., 610), in which case they can represent the width and height of a modified reference picture (e.g., 612). Moreover, pic_width_in_chroma_samples and pic_height_in_chroma_samples can refer to the width and height of a picture (e.g., a current picture, a reference picture, a decoded picture, an output picture, etc.) in units of chroma samples, SubWidthC and SubHeightC can correspond to the chroma sampling relative to luma sampling (e.g., both equal to 1 when there is a corresponding chroma sample for each luma sample (e.g., as in a 4:4:4: format for example), both equal 2 when there is only one chroma sample for 4 luma samples (e.g., as in a 4:2:0 format for example), etc.), and scaling_win_right_offset, scaling_win_left_offset, scaling_win_bottom_offset, scaling_win_top_offset can correspond to the left, right, bottom and top offsets (e.g., 506) in a scaling window (e.g., 502, 602, 608).

The scaling ratio (e.g., 530, 620) can then be derived as follows:

$$\text{hori\_scale\_}fp = ((f\text{RefWidth} << 14) + (\text{PicOutputWidth}C >> 1)) / \text{PicOutputWidth}C \quad \text{Equation (27)}$$

$$\text{vert\_scale\_}fp = ((f\text{RefHeight} << 14) + (\text{PicOutputHeight}C >> 1)) / \text{PicOutputHeight}C \quad \text{Equation (28)}$$

In Equations (27) and (28), PicOutputWidthC and PicOutputHeightC can be the picture width and height variables derived for a picture. For example, PicOutputWidthC and PicOutputHeightC can be the width and height variables of the modified current picture (e.g., 606). In some examples, the variable fRefWidth can be set equal to the PicOutputWidthC of the reference picture in chroma samples, and the variable fRefHeight can be set equal to PicOutputHeightC of the reference picture in chroma samples. In other examples, fRefWidth and fRefHeight can respectively be set equal to pic_width_in_chroma_samples and pic_height_in_chroma_samples of the reference picture. Thus, in some examples, hori_scale_fp can provide the horizontal scaling ratio between the modified reference picture and the modified current picture, and vert_scale_fp can provide the vertical scaling ratio between the modified reference picture and the modified current picture.

In some examples, the starting position (top left corner) of a block in a reference picture, denoted as (xIntC, yIntC), and a filter phase or an offset given in 1/16-sample units, denoted as (xFracC, yFracC), can be derived as follows. Given (refxSb$_C$, refySb$_C$) and (refx$_C$, refy$_C$) representing chroma locations pointed to by a motion vector (refMvLX[0], refMvLX[1]) given in 1/16-sample units, the variables refxSb$_C$, refx$_C$, refySb$_C$, and refy$_C$ can be derived as follows:

$$\text{refxSb}_C = ((x\text{Sb} << 4) + \text{refMvLX}[0]) * \text{hori\_scale\_}fp \quad \text{Equation (29)}$$

$$\text{Refx}_C = ((\text{Sign}(\text{refxSb}) * ((\text{Abs}(\text{refxSb}) + 128) >> 8) + x_C * ((\text{hori\_scale\_}fp + 8) >> 4)) + 32) >> 6 \quad \text{Equation (30)}$$

$$\text{refySb}_C = ((y\text{Sb} << 4) + \text{refMvLX}[1]) * \text{vert\_scale\_}fp \quad \text{Equation (31)}$$

$$\text{refy}_C = ((\text{Sign}(\text{refySb}) * ((\text{Abs}(\text{refySb}) + 128) >> 8) + y_C * ((\text{vert\_scale\_}fp + 8) >> 4)) + 32) >> 6 \quad \text{Equation (32)}$$

The variables xInt$_C$, yInt$_C$, xFrac$_C$ and yFrac$_C$ can also be derived as follows:

$$x\text{ Int}_C = \text{refx}_C >> 4 \quad \text{Equation (33)}$$

$$y\text{ Int}_C = \text{refy}_C >> 4 \quad \text{Equation (34)}$$

$$xFrac_C = refx_C \& 15 \quad \text{Equation (35)}$$

$$yFrac_C = refy_C \& 15 \quad \text{Equation (36)}$$

where (xSb, ySb) can specify the top-left sample of the current coding subblock relative to the top-left chroma sample of the current picture, and refMvLX can be a motion vector for a reference picture list LX (X is 0 and 1).

In some implementations, additional window parameters (e.g., coordinates, sample locations, component locations, units, etc.) can be specified to derive the value of fRefWidth and fRefHeight. The additional window parameters can allow a subset of the reference picture to be used for predicting a subset of the current picture.

In some cases, the scaling window (e.g., 502, 602, 608) can be signaled in a picture parameter set (PPS), a video parameter set (VPS), a sequence parameter set (SPS), or any other parameter set or part of the bitstream. As previously noted, in some cases, a scaling window can be signaled for each picture (e.g., current picture, reference picture, etc.). In some cases, the scaling windows for each picture (e.g., the scaling windows for the current picture and reference picture(s)) can be used to derive the scaling ratio (e.g., 530, 620). In other cases, only one scaling window (e.g., a scaling window associated with the current picture or a reference picture) may be used to calculate the scaling ratio (e.g., 530, 620).

For example, in some cases, the scaling window of the current picture can be used to modify the size of the current picture. The modified size of the current picture and the decoded or cropped size of a reference picture can then be used to derive the scaling ratio. In another example, the scaling window of the reference picture can be used to modify the size of the reference picture. The modified size of the reference picture and the decoded or cropped size of a current picture can then be used to derive the scaling ratio.

In some examples, a scaling window specified with one picture can also be used to modify a size of another picture, which can then be used to calculate the scaling ratio. For example, a scaling window specified with a current picture can be applied to modify the size of a reference picture, or a scaling window specified with a reference picture can be applied to modify the size of a current picture.

In some examples, a scaling window or conformance window can be used to derive a scaling ratio. Moreover, in some cases, the decoded picture can be rescaled based on the scaling window, the conformance window, or the scaling ratio.

In some instances, more than one scaling window may be signalled for a picture. For example, for each reference picture with a different picture size, a different scaling window may be signaled and used for the current picture. Such signalling of multiple scaling windows can be done in various ways. For example, in some cases, a list of scaling windows can be signaled in a parameter set (e.g., SPS, PPS, etc.) or other part of the bitstream. To illustrate, in some cases, for each reference picture of a current picture, a scaling window can be determined based on one or more signalled syntax elements (e.g., an index to a list of scaling windows, etc.) or derived based on the picture resolutions and cropping window parameters of the current picture and the reference picture. For each reference picture of the current picture, a corresponding scaling window can be used to calculate the scaling ratio, and the scaling ratio and a starting position for a block of the reference picture can be used to code one or more samples.

In other examples, a scaling window can be signaled in the PPS, in another parameter set, or elsewhere. When the scaling window for a reference picture is different than a previous scaling window, a new scaling window may be signalled for the reference picture. The signalling for the new scaling window can include the scaling window parameters and an indication (e.g., a flag, a bit, etc.) that the reference picture is associated with a new scaling window signalled.

In some cases, a set of picture resolutions can be specified, and a scaling windows can be specified (e.g., in the PPS, SPS or any other part of the bitstream) for each picture resolution in the set of the picture resolutions or for one or more picture resolutions in the set of picture resolutions. In some examples, one or more scaling windows can be signalled for each pair of picture resolutions. For example, a scaling window can be signaled for picture resolution A and picture resolution B, and can indicate that the scaling window should be used when a current picture has the picture resolution A and a reference picture has the picture resolution B, and vice versa.

In some cases, a scaling window and/or conformance window can identify a portion of a picture (e.g., a region of interest (ROI) of a picture) to be rescaled. In some examples, a scaling window and/or conformance window can identify a ROI of a picture that will be rescaled at the ROI but not at other portions of the picture. In some cases, a picture can be cropped before rescaling according to window offsets specified in a scaling window and/or conformance window.

As previously mentioned, in VVC the output picture is the decoded picture after cropping, which is performed according to the offsets specified in the conformance window. Output pictures may have different sizes inside the same coded video sequence (CVS), which can create problems in certain applications. The techniques described herein can indicate the desired output picture size (e.g., the size intended for the display), also referred to herein as the desired output picture. The indication (e.g., a flag, bit, value, etc.) can be signaled in VPS, SPS or elsewhere, to indicate that an alternative to the decoded cropped picture may be output in CVS. In some examples, since the output process may not affect the decoding process (e.g., the decoding process can be the same regardless of the output picture size), the desired output picture size can be signaled in a video usage information (VUI) message or a supplementary enhancement information (SEI) message.

In some cases, the desired output picture size (e.g., the width and height of the desired output picture) can be signaled. Moreover, in some examples, the signaling of the desired output picture size may not be a multiple of 8 samples as it can be for the pic_width_in_luma_samples and pic_height_in_luma_samples variables, since the picture is not coded and no minimum samples multiplier constraints is applied.

In some cases, the desired output picture size can be signaled, and a constrain can be added providing that the signaled size of the desired output picture cannot be larger than a maximum picture size (e.g., pic_width_max_in_luma_samples and pic_height_max_in_luma_samples) specified in SPS.

To save bits in the desired output picture signaling (e.g., the signaling of the desired output picture size), the desired output picture width and height can be signaled as a delta information (e.g., a difference) over the existing picture width and height signaled in PPS or the maximum picture width and height signaled in SPS.

In some cases, the output picture size signaling can be conditioned on a desired output picture indicator (e.g., flag, value, etc.) being applied. For example, when the desired output picture is applied, the output picture size can then be signaled. In other cases, the desired output picture size can always be signaled regardless of the desired output picture indicator being applied. If enabled, the desired output picture indicator, can indicate that the signaled output picture size is applied. The desired output picture indicator can provide various benefits. For example, the desired output picture indicator can be beneficial if or when there is a need to switch from the cropped decoded picture output to the desired output picture (or vice versa) in the same bitstream, since only one indicator needs to be rewritten to change an associated value (e.g., changing an indicator value from 0 to 1 or 1 to 0) in the bitstream rather than adding a picture size signaling if the desired output picture is used/applied.

In some cases, the maximum picture size signaled in SPS can be used as the output picture size when a desired output picture indicator is enabled. In such cases, there is no need for additional signaling of the desired output picture width and height.

Since the picture before resizing (e.g., rescaling) for the output may have various widths and heights, in some cases, the resampling process can be applied with a certain scaling ratio and the resized/rescaled picture size may be different than the desired output picture size. To bring the resized/rescaled picture to the size of the desired output picture, an output conformance window (e.g., 542) having one or more offsets (e.g., a left, right, top, and/or bottom offset) can be signaled. The one or more offsets can be applied to crop the resized/rescaled picture before output.

The resampling process can include both an upsampling and/or downsampling process, depending on the value of the scaling ratios. One or more filters may be chosen based on the scaling ratios. For example, a downsampling filter may be chosen when the scaling ratio is less than one and an upsampling filter may be chosen when the scaling ratio is more than one. In some cases, the filter choice may also depend on the particular scaling ratio value or one or more other syntax elements such as a picture type, for example. In some examples, a downsampling and/or upsampling filter choice may be indicated per block, CTU, tile, slice, brick, picture or other group of blocks or units. In some cases, filters can be specified in the parameter set, such as SPS, PPS, or APS, or signaled elsewhere. In other cases, the filters can be fixed. In some examples, there can be N number of options of downsampling filters and M number of options of upsampling filters, and the option for downsampling and/or upsampling can be indicated per block, CTU, tile, slice, brick, picture or other group of blocks or units.

In some cases, the choice of filters may also depend on the scaling ratio. For example, in some cases, more filter options may be provided for more important scaling ratios, and less (or one) filter options may be provided for other less important scaling ratios. In some cases, a filter indicator may not be needed when less (or one) filter options are provided.

The output conformance window may be signaled in VPS or SPS. In some cases, the output conformance window can be signaled with an indication of the current picture size since the output conformance window offset values may depend on the current picture size. The indication of the current picture size can be signaled in a parameter set, such as PPS or VPS, or elsewhere in the bitstream. In some cases, the output conformance window signaling can be conditioned on whether a desired output picture is indicated. In other cases, the desired output picture indication can be repeated in a same place where the output conformance window is signaled, such as in PPS, VPS, etc. To avoid parameter set parsing dependency, as in some cases when a desired output picture indication is signaled in SPS, the output conformance window can be signaled in PPS to avoid PPS parsing being dependent on the desired output picture indication signaled in SPS.

In some examples, to indicate the desired output picture and/or output conformance window, an additional PPS indication can be signaled in a slice header. In some cases, a PPS indication is already signaled in a slice header to indicate the desired output picture size, conformance window and/or other parameters. Instead of additionally introducing syntax elements for the desired output picture and the output conformance window parameters, an additional PPS indicator, which may denoted as a desired output picture PPS indicator, can be signaled, since the PPS may already contain picture size and conformance window information, which can be treated as the desired output picture and output conformance window parameters. In some cases, the additional PPS indicator signaling may be dependent on whether the desired output picture is used (e.g., whether the desired output picture indicator is enabled).

If the desired output picture is used and the size of the current picture is different from the desired output picture size, the resizing/rescaling process can be applied to the current picture. The scaling ratio can be derived based on the current picture size and desired output picture size. In some examples, the size of the current picture can be the size of the decoded current picture, the size of the cropped current picture or the size of the current picture after scaling window offsets are applied.

In some cases, more than one output picture size can be specified. In such cases, to indicate which output picture size is used, an index can be signaled. For example, an index can be signaled per picture, which can be used to select the desired output picture size from the plurality of output picture sizes.

In some examples, when the output picture size is indicated in the SEI or VUI, a conformance point may not be specified or defined for the bitstream. In such instances, a decoder-side entity (e.g., decoding device 112) may choose to use the output picture size parameters and perform scaling and output operations as applicable and appropriate.

An example implementation using VVC is shown below.

TABLE 2

| | Descriptor |
|---|---|
| seq_parameter_set_rbsp( ) { | |
| ... | |
|    sps_alternative_output_picture_flag | u(1) |
|    pic_width_max_in_luma_samples | ue(v) |
|    pic_height_max_in_luma_samples | ue(v) |
|    if( sps_alternative_output_picture_flag ) { | |
|       output_pic_width_in_luma_samples | ue(v) |
|       output_pic_height_in_luma_samples | ue(v) |
|    } | |
| ... | |

In some cases, the "if(sps_alternative_output_picture_flag)" condition can be optional. Moreover, sps_alternative_output_picture_flag equal to 1 specifies that each output picture has an alternative to the output picture size specified in PPS for the picture, and sps_alternative_output_picture_flag equal to 0 specifies that the decoded picture after applying a conformance cropping window specified in PPS for the picture is output. The variable output_pic_width_in_luma_samples specifies the width of each output picture referring to the SPS in units of luma samples, and the pic_width_in_luma_samples may not equal 0 and may be less than or equal to pic_width_max_in_luma_samples. The variable output_pic_height_in_luma_samples specifies the height of each output picture referring to the SPS in units of luma samples, and pic_height_in_luma_samples may not equal to 0 and may be less than or equal to pic_height_max_in_luma_samples.

TABLE 3

|  | Descriptor |
|---|---|
| pic_parameter_set_rbsp( ) { |  |
|     pps_pic_parameter_set_id | ue(v) |
|     pps_seq_parameter_set_id | ue(v) |
|     pic_width_in_luma_samples | ue(v) |
|     pic_height_in_luma_samples | ue(v) |
|     conformance_window_flag | u(1) |
|     if( conformance_window_flag ) { |  |
|         conf_win_left_offset | ue(v) |
|         conf_win_right_offset | ue(v) |
|         conf_win_top_offset | ue(v) |
|         conf_win_bottom_offset | ue(v) |
|     } |  |
|     scaling_window_flag | u(1) |
|     if( scaling_conformance_window_flag ) { |  |
|         scaling_win_left_offset | ue(v) |
|         scaling_win_right_offset | ue(v) |
|         scaling_win_top_offset | ue(v) |
|         scaling_win_bottom_offset | ue(v) |
|     } |  |
|     output_cropping_window_flag | u(1) |
|     if( output_cropping_window_flag ) { |  |
|         output_win_left_offset | ue(v) |
|         output_win_right_offset | ue(v) |
|         output_win_top_offset | ue(v) |
|         output_win_bottom_offset | ue(v) |
|     } |  |
| } |  |

In Table 3, scaling_window_flag equal to 1 indicates that the scaling window offset parameters follow next in the PPS, and scaling_window_flag equal to 0 indicates that the scaling window offset parameters are not present. Moreover, scaling_win_left_offset, scaling_win_right_offset, scaling_win_top_offset, and scaling_win_bottom_offset specify the offsets in luma samples applied to the picture size for scaling ratio calculation. When scaling_window_flag is equal to 0, the values of scaling_win_left_offset, scaling_win_right_offset, scaling_win_top_offset, and scaling_win_bottom_offset are inferred to be equal to 0.

The variables PicOutputWidthL and PicOutputHeightL can be derived using Equations (13) and (14), and the scaling ratio can be derived using Equations (15) and (16), as previously described. output_cropping_window_flag equal to 1 indicates that the output cropping window offset parameters follow next in the PPS.

The variable output_cropping_window_flag equaling 0 indicates that the output cropping window offset parameters are not present, and the output_win_left_offset, output_win_right_offset, output_win_top_offset, and output_win_bottom_offset specify the samples of the pictures in the CVS that are output from the decoding process (e.g., in terms of a rectangular region specified in picture coordinates for output). When output_window_flag is equal to 0, the values of output_win_left_offset, output_win_right_offset, output_win_top_offset, and output_win_bottom_offset are inferred to be equal to 0.

The output cropping window contains the luma samples with horizontal picture coordinates from SubWidthC*output_win_left_offset to output_pic_width_in_luma_samples−(SubWidthC*output_win_right_offset+1) and vertical picture coordinates from SubHeightC*output_win_top_offset to output_pic_height_in_luma_samples−(SubHeightC*output_win_bottom_offset+1).

The value of SubWidthC*(output_win_left_offset+output_win_right_offset) can be less than or equal to pic_width_max_in_luma_samples, and the value of SubHeightC*(output_win_top_offset+output_win_bottom_offset) can be less than pic_height_max_in_luma_samples.

In some cases, the picture output process described below can be implemented instantaneously/simultaneously (or nearly instantaneously/simultaneously) at the CPB removal time of access unit n, or CpbRemovalTime[n].

When picture n has PictureOutputFlag equal to 1, the picture's DPB output time DpbOutputTime[n] is derived as follows:

Equation (37)

```
if( !DecodingUnitHrdFlag )
    DpbOutputTime[ n ] = CpbRemovalTime[ n ] + ClockTick *
    picDpbOutputDelay − picDpbOutputDelta[ OpTid ]
else
    DpbOutputTime[ n ] = AuCpbRemovalTime[ n ] +
    ClockSubTick * picSptDpbOutputDuDelay
``` where picDpbOutputDelay is the value of pic_dpb_output_delay and picDpbOutputDelta is the value of picDpbOutputDelta[OpTid] derived according to cpb_removal_delay_minus1[OpTid], and cpb_removal_delay_delta_idx[OpTid] in the picture timing SEI message associated with access unit n, and cpb_removal_delay_delta[cpb_removal_delay_delta_idx[OpTid]] in the buffering period SEI message associated with access unit n, and picSptDpbOutputDuDelay is the value of pic_spt_dpb_output_du_delay, when present, in the decoding unit information SEI messages associated with access unit n, or the value of pic_dpb_output_du_delay in the picture timing SEI message associated with access unit n when there is no decoding unit information SEI message associated with access unit n or no decoding unit information SEI message associated with access unit n has pic_spt_dpb_output_du_delay present.

In some cases, when the syntax element pic_spt_dpb_output_du_delay is not present in any decoding unit information SEI message associated with access unit n, the value can be inferred to be equal to pic_dpb_output_du_delay in the picture timing SEI message associated with access unit n.

The output of the current picture is specified as follows. If PictureOutputFlag is equal to 1 and DpbOutputTime[n] is equal to CpbRemovalTime[n], the current picture is output. Otherwise, if PictureOutputFlag is equal to 0, the current picture is not output, but is stored in the DPB. Otherwise, when PictureOutputFlag is equal to 1 and DpbOutputTime[n] is greater than CpbRemovalTime[n], the current picture is output later and stored in the DPB and is output at time DpbOutputTime[n] unless indicated not to be output by the decoding or inference of no_output_of_prior_pics_flag equal to 1 at a time that precedes DpbOutputTime[n].

When output, if sps_alternative_output_picture_flag is equal to 1 and the cropped picture size, and the picture size after applying the the conformance cropping window specified in the PPS for the picture is different from the output picture size specified in the PPS for the picture, the scaling ratio can be derived based on the cropped picture size and the output picture size as follows:

PicCroppedWidth$L$=pic_width_in_luma_samples−
    SubWidth$C$*(conf_win_right_offset+conf_win_
    left_offset)                             Equation (38)

$$\text{PicCroppedHeight}L = \text{pic\_height\_in\_luma\_samples} - \text{SubHeight}C * (\text{conf\_win\_bottom\_offset} + \text{conf\_win\_top\_offset}) \quad \text{Equation (39)}$$

$$\text{hor\_scale} = ((\text{PicCroppedWidth}L << 14) + (\text{output\_pic\_width\_in\_luma\_samples} >> 1))/\text{output\_pic\_width\_in\_luma\_samples} \quad \text{Equation (40)}$$

$$\text{ver\_scale} = ((\text{PicCroppedHeight}L << 14) + (\text{output\_pic\_height\_in\_luma\_samples} >> 1))/\text{output\_pic\_height\_in\_luma\_samples} \quad \text{Equation (41)}$$

The rescaling process can be applied to the cropped picture using hor_scale and ver_scale scaling factors. The rescaled picture can be cropped using the output cropping window specified in the PPS for the picture. Otherwise, when sps_alternative_output_picture_flag is equal to 0 or the cropped picture size is equal to the output picture size, the picture is cropped using the conformance cropping window specified in the PPS for the picture.

When picture n is a picture that is output and is not the last picture of the bitstream that is output, the value of the variable DpbOutputInterval[n] can be derived as follows:

$$\text{DpbOutputInterval}[n] = \text{DpbOutputTime}[\text{nextPicInOutputOrder}] - \text{DpbOutputTime}[n] \quad \text{Equation (42)}$$

where nextPicInOutputOrder is the picture that follows picture n in output order and has PictureOutputFlag equal to 1.

A "bumping" process can be implemented according to the following steps. First, the picture that is set for output first is selected as the one having the smallest value of PicOrderCntVal of all pictures in the DPB marked as "needed for output". If sps_alternative_output_picture_flag is equal to 1 and the cropped picture size (e.g., the picture size after applying the the conformance cropping window specified in the PPS for the picture) is different from the output picture size specified in the PPS for the picture, the scaling ratio can be derived based on the cropped picture size and the output picture size as follows:

$$\text{PicCroppedWidth}L = \text{pic\_width\_in\_luma\_samples} - \text{SubWidth}C * (\text{conf\_win\_right\_offset} + \text{conf\_win\_left\_offset}) \quad \text{Equation (43)}$$

$$\text{PicCroppedHeight}L = \text{pic\_height\_in\_luma\_samples} - \text{SubHeight}C * (\text{conf\_win\_bottom\_offset} + \text{conf\_win\_top\_offset}) \quad \text{Equation (44)}$$

$$\text{hor\_scale} = ((\text{PicCroppedWidth}L << 14) + (\text{output\_pic\_width\_in\_luma\_samples} >> 1))/\text{output\_pic\_width\_in\_luma\_samples} \quad \text{Equation (45)}$$

$$\text{ver\_scale} = ((\text{PicCroppedHeight}L << 14) + (\text{output\_pic\_height\_in\_luma\_samples} >> 1))/\text{output\_pic\_height\_in\_luma\_samples} \quad \text{Equation (46)}$$

The rescaling process can be applied to the cropped picture with using hor_scale and ver_scale scaling factors. The resealed picture can be cropped using the output cropping window specified in the PPS for the picture. Otherwise, when sps_alternative_output_picture_flag is equal to 0 or the cropped picture size is the equal to the output picture size, the picture is cropped using the conformance cropping window specified in the SPS for the picture, the cropped picture is output, and the picture is marked as "not needed for output". When the picture storage buffer that included the picture that was cropped and output contains a picture marked as "unused for reference", the picture storage buffer can be emptied. In some examples, for any two pictures picA and picB that belong to the same CVS and are output by the "bumping process", when picA is output earlier than picB, the value of PicOrderCntVal of picA is less than the value of PicOrderCntVal of picB.

In some examples, one or more offset parameters specified in the methods disclosed herein (e.g., scaling window, etc.) may be signalled as se(v) (e.g., signed integer 0-th order Exp-Golomb-coded syntax element with the left bit first), and/or more generally allowing negative values. Signalling negative values enables to define several more scaling ratios that may not be indicated otherwise.

In other examples, the values of output picture width and height (output_pic_width_in_luma_samples and output_pic_height_luma_samples) may not be signalled, but the output cropping window offsets may be used to determine the output picture size and the scaling ratio for resampling.

In some cases, the variables hor_scale and ver_scale in the picture output process can be derived using pic_width_in_luma_samples and pic_height_luma_samples of the current picture as opposed to PicCroppedWidthL and PicCroppedHeightL.

Various division operations specified herein (e.g., using shifts, additions and offsets) provide non-limiting illustrations of how fixed-point arithmetic can be used, and the parameters used herein are provided as non-limiting examples for illustration purposes. It should be understood that the methods and techniques disclosed herein apply to other forms and/or uses of the division and other mathematical operations.

In some of the above examples, scaling ratios are derived based on the picture width and height expressed in luma samples. In other examples, the scaling ratios may be derived per component using picture width and height expressed in the samples of that component.

FIG. 7 is a flowchart illustrating an example method 700 for calculating a scaling ratio and decoupling the scaling ratio calculation from a picture output process. At block 702, the method 700 can include obtaining a current picture (e.g., 604) of video data, and at block 704 the method 700 can include determining one or more scaling windows (e.g., 502, 602, 608) associated with the current picture and/or a reference picture (e.g., 610) selected for use in coding the current picture. In some cases, the one or more scaling windows can be associated with one or more additional reference pictures. For example, the one or more scaling windows can be associated with multiple reference pictures for the current picture (e.g., bi-directional inter-prediction).

In some examples, the one or more scaling windows can include a first scaling window (e.g., 602) for the current picture and a second scaling window (e.g., 608) for the reference picture. In other examples, the one or more scaling windows can include a scaling window for both the current picture and the reference picture. In some examples, the one or more scaling windows can be derived for a horizontal and/or a vertical direction.

In some examples, the one or more scaling windows can be determined from a picture parameter set (PPS). In some cases, the one or more scaling windows can be included in the PPS, and the PPS including the one or more scaling windows can be stored and/or transmitted (e.g., in an encoded video bitstream). For example, in some cases, a scaling window of the current picture can be determined from a PPS referred/referenced by the current picture, and/or a scaling window of the reference picture can be determined from a PPS referred/and/or referenced by the reference window.

In some aspects, the one or more scaling windows can include scaling window offsets (e.g., 506). In some examples, the scaling window offsets can include a left scaling window offset, a right scaling window offset, a top scaling window offset, and/or a bottom scaling window offset. In some cases, the one or more scaling windows can include a negative value. Moreover, scaling window offset signaling can allow a negative value.

At block 706, the method 700 can include determining a first size of the current picture and/or a second size of the reference picture. In some examples, the first size can include a first height and/or a first width of the current picture and the second size can include a second height and/or a second width of the reference picture.

At block 708, the method 700 can include determining one or more scaling ratios (e.g., 530, 620) associated with the current picture and/or the reference picture based on the one or more scaling windows and on the first size (e.g., of the current picture) and/or the second size (e.g., of the reference picture). In some cases, the one or more scaling ratios can be determined based on scaling window offsets (e.g., top, bottom, right, and/or left scaling window offsets) associated with the one or more scaling windows. For example, in some cases, one or more scaling window offsets associated with a scaling window of the current picture can be added to the first height and/or the first width of the current picture to determine a scaling ratio associated with the current picture. Similarly, in some cases, one or more scaling window offsets associated with a scaling window of the reference picture can be added to the second height and/or the second width of the reference picture to determine a scaling ratio associated with the reference picture.

In some cases where the one or more scaling windows include a first scaling window for the current picture and a second scaling window for the reference picture, the one or more scaling ratios can be determined based on the first scaling window and the second scaling window.

In some aspects, the method 700 can include adjusting, based on the one or more scaling ratios, one or more motion compensation parameters associated with the current picture and/or the reference picture. In some examples, the one or more motion compensation parameters can include a starting position of one or more blocks in the reference picture, an adjusted interpolation filter phase, one or more component (e.g., luma, chroma) locations referenced by and/or corresponding to one or more motion vectors, and/or one or more motion vectors. In some examples, the adjusted interpolation filter phase can include one or more offsets.

Moreover, in some cases, the starting position of the one or more blocks in the reference picture, the interpolation filter phase, and/or the one or more component locations can be adjusted to account for the one or more scaling ratios. For example, in some cases, the starting position of the one or more blocks in the reference picture, the interpolation filter phase, and/or the one or more component locations can be calculated using, and/or implemented in, Equations (17-20), Equations (21-24), Equations (29)-(32) and/or Equations (33)-(36) described above.

In some aspects, the method 700 can include obtaining one or more conformance windows (e.g., 542) associated with the current picture and/or the reference picture, and resizing the current picture and/or the reference picture based on the one or more conformance windows. In some examples, the one or more conformance windows can include one or more window offsets. In some cases, the one or more conformance windows can be obtained, determined, and/or signaled from/via a sequence parameter set (SPS). In some examples, the one or more conformance windows and the one or more scaling windows are signaled in an encoded video bitstream.

In some examples, the method 700 can include including the one or more conformance windows in an SPS, and storing and/or transmitting the SPS including the one or more conformance windows.

In some aspects, the method 700 can further include, after resizing the current picture and/or the reference picture based on the one or more conformance windows, performing motion compensation on the current picture based on the adjusted one or more motion compensation parameters.

In some aspects, the method 700 can include obtaining a predetermined maximum picture size indicating a maximum picture width and a maximum picture height, and generating an output picture based on the predetermined maximum picture size and a conformance window including one or more window offsets. In some examples, the output picture can be the current picture resized based on the predetermined maximum picture size and the conformance window. In some cases, the current picture can be resized by applying the one or more window offsets to the maximum picture width and the maximum picture height.

Moreover, in some aspects, the predetermined maximum picture size and/or the conformance window can be determined from a sequence parameter set (SPS). In some aspects, the predetermined maximum picture size and/or the conformance window can be included in an SPS, and the SPS including the predetermined maximum picture size and/or the conformance window can be stored and/or transmitted.

In some aspects, the method 700 can include generating an encoded video bitstream including the one or more scaling windows and a set of conformance windows. The set of conformance windows can include one or more first window offsets for resizing the current picture and one or more second window offsets for resizing the reference picture. In some examples, the method 700 can include storing and/or transmitting the encoded video bitstream including the one or more scaling windows and the set of conformance windows.

In some aspects, the method 700 can include generating an encoded video bitstream (e.g., via encoding device 104) that includes the video data. In other aspects, the method 700 can include decoding the encoded video bitstream (e.g., via decoding device 112).

In some examples, the method 700 can include generating an encoded bitstream including one or more scaling windows and/or one or more conformance windows. In some examples, one or more scaling windows and/or conformance windows can be included in the encoded bitstream. In some examples, the one or more scaling windows and/or conformance windows can be signaled and can include one or more respective values (e.g., one or more respective window offsets) corresponding to the one or more scaling windows and/or conformance windows.

In some aspects, the method 700 can include obtaining a maximum picture size indicating a maximum picture width and a maximum picture height; and generating an output picture based on the maximum picture size and a conformance window including one or more window offsets. In some examples, a size of the current picture can equal the maximum picture size, and the output picture can include the current picture with the size equal to the maximum picture size cropped based on the conformance window. In some cases, the current picture (with the size equal to the maximum picture size) can be cropped by applying the one or more window offsets to the current picture. In some cases, the maximum picture size and the conformance window are determined from a sequence parameter set.

In some examples, blocks 704, 706, 708 and/or other aspects of method 700 described above can be performed using any of Equations (13) through (36) described above. Moreover, in some cases, at least some aspects of method 700 described above can be implemented using at least some of the Equations (13) through (46) described above.

In some implementations, the processes (or methods) described herein (including method 700) can be performed by a computing device or an apparatus, such as the system 100 shown in FIG. 1. For example, the processes can be performed by the encoding device 104 shown in FIG. 1 and FIG. 8, by another video source-side device or video transmission device, by the decoding device 112 shown in FIG. 1 and FIG. 9, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of method 700.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 8, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 8 represents an example of a video encoder configured to perform any of the techniques described herein, including the process described above with respect to FIG. 7. In some cases, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 9 represents an example of a video decoder configured to perform any of the techniques described herein, including the process described above with respect to FIG. 7.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of coding video data, the method comprising:
obtaining a current picture of video data;
determining one or more scaling windows identifying at least one of a top offset, a bottom offset, a left offset, or a right offset for determining at least one scaling ratio for at least one of the current picture and a reference picture selected for use in coding the current picture;

determining at least one of a first size of the current picture or a second size of the reference picture, the first size comprising a first height and a first width of the current picture and the second size comprising a second height and a second width of the reference picture;

based on the one or more scaling windows and at least one of the first size or the second size, determining one or more scaling ratios associated with adjusting one or more motion compensation parameters corresponding to at least one of the current picture or the reference picture; and determining one or more conformance windows associated with resizing at least one of the current picture or the reference picture for output, wherein the one or more conformance windows are different from the one or more scaling windows.

2. The method of claim 1, wherein the one or more scaling ratios are derived for horizontal and vertical directions.

3. The method of claim 1, wherein the one or more scaling windows comprise a scaling window of the current picture, wherein the scaling window of the current picture is determined from a picture parameter set (PPS) referred by the current picture.

4. The method of claim 1, wherein the one or more scaling windows comprise a scaling window of the reference picture, wherein the scaling window of the reference picture is determined from a picture parameter set (PPS) referred by the reference picture.

5. The method of claim 1, wherein the one or more scaling windows comprise scaling window offsets, wherein the scaling window offsets comprise at least one of a left scaling window offset, a right scaling window offset, a top scaling window offset, or a bottom scaling window offset.

6. The method of claim 5, wherein at least one scaling window offset of the scaling window offsets comprises a negative value.

7. The method of claim 5, wherein determining the one or more scaling ratios comprises adding the scaling window offsets to at least one of the first size of the current picture or the second size of the reference picture.

8. The method of claim 1, wherein the one or more scaling windows comprise a first scaling window associated with the current picture and a second scaling window associated with the reference picture, and wherein the one or more scaling ratios are determined based on the first scaling window and the second scaling window.

9. The method of claim 1, further comprising:
including the one or more scaling windows in a picture parameter set (PPS); and
at least one of storing or transmitting the PPS including the one or more scaling windows.

10. The method of claim 1, further comprising:
based on the one or more scaling ratios, adjusting one or more motion compensation parameters associated with at least one of the current picture or the reference picture.

11. The method of claim 1, further comprising:
resizing at least one of the current picture or the reference picture based on the one or more conformance windows.

12. The method of claim 11, wherein the one or more conformance windows are determined from a sequence parameter set (SPS).

13. The method of claim 11, further comprising:
including the one or more conformance windows in a sequence parameter set (SPS); and
at least one of storing or transmitting the SPS including the one or more conformance windows.

14. The method of claim 1, further comprising:
obtaining a maximum picture size indicating a maximum picture width and a maximum picture height; and
generating an output picture based on the maximum picture size and a conformance window comprising one or more window offsets, wherein a size of the current picture equals the maximum picture size, and wherein the output picture comprises the current picture with the size equal to the maximum picture size cropped based on the conformance window.

15. The method of claim 14, wherein the current picture is cropped by applying the one or more window offsets to the current picture.

16. The method of claim 14, wherein the maximum picture size and the conformance window are determined from a sequence parameter set (SPS).

17. The method of claim 14, further comprising:
including the maximum picture size and the conformance window in a sequence parameter set (SPS); and
at least one of storing or transmitting the SPS including the maximum picture size and the conformance window.

18. The method of claim 1, wherein the one or more scaling windows are further associated with one or more additional reference pictures selected for use in coding the current picture, wherein the one or more scaling ratios are further associated with the one or more additional reference pictures.

19. The method of claim 1, further comprising:
generating an encoded video bitstream including the one or more scaling windows and a set of conformance windows, the set of conformance windows including one or more first window offsets for resizing the current picture and one or more second window offsets for resizing the reference picture; and
at least one of storing or transmitting the encoded video bitstream.

20. An apparatus comprising:
memory; and
one or more processors coupled to the memory, the one or more processors being configured to:
obtain a current picture of video data;
determine one or more scaling windows identifying at least one of a top offset, a bottom offset, a left offset, or a right offset for determining at least one scaling ratio for at least one of the current picture or a reference picture selected for use in coding the current picture;
determine at least one of a first size of the current picture or a second size of the reference picture, the first size comprising a first height and a first width of the current picture and the second size comprising a second height and a second width of the reference picture;
based on the one or more scaling windows and at least one of the first size or the second size, determine one or more scaling ratios associated with adjusting one or more motion compensation parameters corresponding to at least one of the current picture or the reference picture; and
determine one or more conformance windows associated with resizing at least one of the current picture or the reference picture for output, wherein the one or more conformance windows are different from the one or more scaling windows.

21. The apparatus of claim 20, wherein the one or more scaling ratios are derived for horizontal and vertical directions.

22. The apparatus of claim 20, wherein the one or more scaling windows comprise a scaling window of the current picture, wherein the scaling window of the current picture is determined from a picture parameter set (PPS) referred by the current picture.

23. The apparatus of claim 20, wherein the one or more scaling windows comprise a scaling window of the reference picture, wherein the scaling window of the reference picture is determined from a picture parameter set (PPS) referred by the reference picture.

24. The apparatus of claim 20, wherein the one or more scaling windows comprise scaling window offsets, wherein the scaling window offsets comprise at least one of a left scaling window offset, a right scaling window offset, a top scaling window offset, or a bottom scaling window offset.

25. The apparatus of claim 24, wherein at least one scaling window offset of the scaling window offsets comprises a negative value.

26. The apparatus of claim 24, wherein determining the one or more scaling ratios comprises adding the scaling window offsets to at least one of the first size of the current picture or the second size of the reference picture.

27. The apparatus of claim 20, wherein the one or more scaling windows comprise a first scaling window associated with the current picture and a second scaling window associated with the reference picture, and wherein the one or more scaling ratios are determined based on the first scaling window and the second scaling window.

28. The apparatus of claim 20, the one or more processors being configured to:
include the one or more scaling windows in a picture parameter set (PPS); and
at least one of store or transmit the PPS including the one or more scaling windows.

29. The apparatus of claim 20, the one or more processors being configured to:
adjust, based on the one or more scaling ratios, one or more motion compensation parameters associated with at least one of the current picture or the reference picture.

30. The apparatus of claim 20, the one or more processors being configured to:
resize at least one of the current picture or the reference picture based on the one or more conformance windows.

31. The apparatus of claim 30, wherein the one or more conformance windows are determined from a sequence parameter set (SPS).

32. The apparatus of claim 30, the one or more processors being configured to:
include the one or more conformance windows in a sequence parameter set (SPS); and
at least one of store or transmit the SPS including the one or more conformance windows.

33. The apparatus of claim 20, the one or more processors being configured to:
obtain a maximum picture size indicating a maximum picture width and a maximum picture height; and
generate an output picture based on the maximum picture size and a conformance window comprising one or more window offsets, wherein a size of the current picture equals the maximum picture size, and wherein the output picture comprises the current picture with the size equal to the maximum picture size cropped based on the conformance window.

34. The apparatus of claim 33, wherein the current picture is cropped by applying the one or more window offsets to the current picture.

35. The apparatus of claim 33, wherein the maximum picture size and the conformance window are determined from a sequence parameter set (SPS).

36. The apparatus of claim 33, the one or more processors being configured to:
include the maximum picture size and the conformance window in a sequence parameter set (SPS); and
at least one of store or transmit the SPS including the maximum picture size and the conformance window.

37. The apparatus of claim 20, wherein the one or more scaling windows are further associated with one or more additional reference pictures selected for use in coding the current picture, wherein the one or more scaling ratios are further associated with the one or more additional reference pictures.

38. The apparatus of claim 20, the one or more processors being configured to:
generate an encoded video bitstream including the one or more scaling windows and a set of conformance windows, the set of conformance windows including one or more first window offsets for resizing the current picture and one or more second window offsets for resizing the reference picture; and
at least one of store or transmit the encoded video bitstream.

39. The apparatus of claim 20, wherein the apparatus is a mobile device.

40. A non-transitory computer-readable storage medium comprising instructions stored thereon which, when executed by one or more processors, cause the one or more processors to:
obtain a current picture of video data;
determine one or more scaling windows identifying at least one of a top offset, a bottom offset, a left offset, or a right offset for determining at least one scaling ratio for at least one of the current picture and a reference picture selected for use in coding the current picture;
determine at least one of a first size of the current picture or a second size of the reference picture, the first size comprising a first height and a first width of the current picture and the second size comprising a second height and a second width of the reference picture;
based on the one or more scaling windows and at least one of the first size or the second size, determine one or more scaling ratios associated with adjusting one or more motion compensation parameters corresponding to at least one of the current picture or the reference picture; and
determine one or more conformance windows associated with resizing at least one of the current picture or the reference picture for output, wherein the one or more conformance windows are different from the one or more scaling windows.

* * * * *